(12) United States Patent
Tjin et al.

(10) Patent No.: US 10,509,154 B2
(45) Date of Patent: Dec. 17, 2019

(54) LIGHTING APPARATUS HAVING AN OPTICAL WAVEGUIDE AND A PLURALITY OF LIGHT INTERACTING STRUCTURES AND METHOD OF FORMING THE SAME

(71) Applicants: Nanyang Technological University, Singapore (SG); Technolite (Singapore) Pte Ltd, Singapore (SG)

(72) Inventors: Swee Chuan Tjin, Singapore (SG); Seongwoo Yoo, Singapore (SG); Ho Meng @Tay Ho Meng Chia, Singapore (SG)

(73) Assignees: Nanyang Technological University, Singapore (SG); Technolite (Singapore) Pte Ltd, Singapore (SG)

( * ) Notice: Subject to any disclaimer, the term of this patent is extended or adjusted under 35 U.S.C. 154(b) by 0 days.

(21) Appl. No.: 15/777,611

(22) PCT Filed: Nov. 17, 2016

(86) PCT No.: PCT/SG2016/050570
§ 371 (c)(1),
(2) Date: May 18, 2018

(87) PCT Pub. No.: WO2017/086880
PCT Pub. Date: May 26, 2017

(65) Prior Publication Data
US 2018/0329129 A1    Nov. 15, 2018

(30) Foreign Application Priority Data
Nov. 20, 2015   (SG) .............................. 10201509564S

(51) Int. Cl.
*F21V 8/00* (2006.01)
*F21K 9/61* (2016.01)
(Continued)

(52) U.S. Cl.
CPC .............. *G02B 6/003* (2013.01); *B29C 48/00* (2019.02); *F21K 9/61* (2016.08); *G02B 1/04* (2013.01);
(Continued)

(58) Field of Classification Search
CPC .. G02B 6/0028; G02B 6/0091; G02B 6/0023; G02B 6/00; G02B 1/04; G02B 1/045;
(Continued)

(56) References Cited

U.S. PATENT DOCUMENTS 6,167,182 A    12/2000   Shinohara et al.
6,367,941 B2    4/2002   Lea et al.
(Continued)

FOREIGN PATENT DOCUMENTS

CN    101122650    2/2008
CN    103047548    4/2013

OTHER PUBLICATIONS

Corning, "How It Works: Fibrance Light-Diffusing Fiber," retrieved May 11, 2018, from https://www.corning.com/worldwide/en/innovation/the-glass-age/science-of-glass/how-it-works-light-diffusing-fiber.html.

(Continued)

*Primary Examiner* — Tracie Y Green
(74) *Attorney, Agent, or Firm* — Womble Bond Dickinson (US) LLP

(57) ABSTRACT

According to embodiments of the present invention, a lighting apparatus is provided. The lighting apparatus includes at least one light source configured to provide a source light, an optical waveguide optically coupled to the at least one light source, the optical waveguide having at least one input region through which the source light enters the optical waveguide for propagation within the optical waveguide, and a plurality of light interacting structures arranged within (Continued)

the optical waveguide, the plurality of light interacting structures adapted to interact with the source light to provide an illumination light emitted from the optical waveguide to an ambient environment, wherein a concentration of the plurality of light interacting structures increases, along a length portion of the optical waveguide, in a direction away from the at least one input region.

18 Claims, 9 Drawing Sheets

(51) Int. Cl.
*G02B 1/04* (2006.01)
*G02B 6/00* (2006.01)
*B29C 48/00* (2019.01)
*B29L 11/00* (2006.01)
*B29C 48/05* (2019.01)

(52) U.S. Cl.
CPC ............... *G02B 1/045* (2013.01); *G02B 6/00* (2013.01); *G02B 6/0023* (2013.01); *G02B 6/0028* (2013.01); *G02B 6/0031* (2013.01); *G02B 6/0041* (2013.01); *G02B 6/0051* (2013.01); *G02B 6/0061* (2013.01); *G02B 6/0065* (2013.01); *G02B 6/0091* (2013.01); *G02B 6/0096* (2013.01); *B29C 48/05* (2019.02); *B29L 2011/0075* (2013.01); *G02B 6/0055* (2013.01)

(58) Field of Classification Search
CPC ................ G02B 6/0055; B29C 47/00; B29L 2011/0075
See application file for complete search history.

(56) References Cited

U.S. PATENT DOCUMENTS

| | | |
|---|---|---|
| 6,621,973 B1 | 9/2003 | Hoffman |
| 7,433,565 B2 | 10/2008 | Joseph et al. |
| 2002/0131275 A1 | 9/2002 | Yamamoto et al. |
| 2004/0179777 A1 | 9/2004 | Buelow, II et al. |
| 2005/0074216 A1 | 4/2005 | Irie |
| 2006/0044824 A1 | 3/2006 | Chen |
| 2009/0034230 A1 | 2/2009 | Lim et al. |
| 2009/0067178 A1 | 3/2009 | Huang et al. |
| 2009/0290373 A1 | 11/2009 | Shin |
| 2011/0122646 A1 | 5/2011 | Bickham et al. |
| 2012/0087111 A1 | 4/2012 | Eisen et al. |
| 2015/0029742 A1 | 1/2015 | Chen |

OTHER PUBLICATIONS

Deller, C. A., "LEDs and Doped Polymer Light Guides for Efficient Illumination and Colour Engineering," University of Technology Sydney, PhD Thesis, Jun. 2005.

McKinsey & Company, "Lighting the way: Perspectives on the global lighting market," 2nd edition, Aug. 2012.

Poly Optics Australia Pty. Ltd., "Poly Optic Solid Core Fibre," May 7, 2003, retrieved from http://www.fiberopticlight.com/wp-content/uploads/2016/07/fibre_optic_tech.pdf.

Poly Optics Australia Pty. Ltd., "Poly Optics—Super Side Light Fibre Optic Cable," 2016, retrieved May 11, 2018 from http://www.fiberopticlight.com/products/fibre-optic-cable/super-side-light-fibre-optic-cable-info/.

Poly Optics Australia Pty. Ltd., "Poly Optics—Super Side Light Fibre" and "Poly Optics—Super Side Light Fibre Versus Side Light Fibre," Oct. 29, 2004, retrieved from http://www.fiberopticlight.com/wp-content/uploads/2016/07/supersidelight_cad.pdf.

170

| Form an optical waveguide, the optical waveguide including a cladding with a hollow core region surrounded by the cladding | ~172 |

| Connect at least one light source to the optical waveguide at an at least one input region of the optical waveguide, the at least one light source configured to provide a source light to enter the optical waveguide through the at least one input region for propagation within the hollow core region | ~174 |

| Form a plurality of light interacting structures on at least one inner surface of the cladding, the plurality of light interacting structures adapted to interact with the source light to provide an illumination light emitted from the optical waveguide to an ambient environment | ~176 |

| Form an optical waveguide for optical coupling to at least one light source, the optical waveguide having at least one input region for a source light to enter the optical waveguide for propagation within the optical waveguide | ~182 |

| Form a plurality of light interacting structures within the optical waveguide, the plurality of light interacting structures adapted to interact with the source light to provide an illumination light emitted from the optical waveguide to an ambient environment, wherein a concentration of the plurality of light interacting structures increases, along a length portion of the optical waveguide, in a direction away from the at least one input region | ~184 |

FIG. 1F

LIGHTING APPARATUS HAVING AN OPTICAL WAVEGUIDE AND A PLURALITY OF LIGHT INTERACTING STRUCTURES AND METHOD OF FORMING THE SAME

CROSS-REFERENCE TO RELATED APPLICATIONS

This application is a national stage filing under 35 U.S.C. § 371 of PCT/SG2016/050570, filed 17 Nov. 2016, which claims the benefit of priority of Singapore patent application No. 10201509564S, filed 20 Nov. 2015, each of these applications being hereby incorporated by reference in their entirety for all purposes.

TECHNICAL FIELD

Various embodiments relate to a lighting apparatus and a method of forming the lighting apparatus.

BACKGROUND

Current light-emitting diode (LED) façade lighting uses LED strips composed of a series of LED chips along the strip. A typical LED strip of one meter consists of 100 LED chips that are spaced evenly for continuous and homogeneous illumination. One common problem of the LED strip is related to the reliability of the LED chips. Among the 100 LED chips, it is common to see a few that fail before others, thus creating an uneven illumination along the strip. This is an undesirable effect for façade lighting. More seriously, the LED chips cannot be replaced individually, and the whole strip has to be replaced and re-installed. Therefore, maintenance is very costly. Another disadvantage of the LED strip is its limited bending flexibility, and this occasionally limits its deployment where the façade is curved.

While there are known products using an illuminating waveguide, they are only suitable for small-scale lighting applications such as decorative lighting in automotive or electric devices. The existing technologies do not have the scalability and properties that meet the market needs for a unique façade lighting product in the architectural lighting segment. Further, for these products, the luminance is not high and the illumination is only perceivable in a dark room. Such low level luminance is certainly not sufficient for façade lighting.

SUMMARY

According to an embodiment, a lighting apparatus is provided. The lighting apparatus may include at least one light source configured to provide a source light, an optical waveguide optically coupled to the at least one light source, the optical waveguide having at least one input region through which the source light enters the optical waveguide for propagation within the optical waveguide, and a plurality of light interacting structures arranged within the optical waveguide, the plurality of light interacting structures adapted to interact with the source light to provide an illumination light emitted from the optical waveguide to an ambient environment, wherein a concentration of the plurality of light interacting structures increases, along a length portion of the optical waveguide, in a direction away from the at least one input region.

According to an embodiment, a lighting apparatus is provided. The lighting apparatus may include at least one light source configured to provide a source light, an optical waveguide optically coupled to the at least one light source, the optical waveguide including a cladding and a hollow core region surrounded by the cladding, wherein the optical waveguide has at least one input region through which the source light enters the optical waveguide for propagation within the hollow core region, and a plurality of light interacting structures arranged on at least one inner surface of the cladding, the plurality of light interacting structures adapted to interact with the source light to provide an illumination light emitted from the optical waveguide to an ambient environment.

According to an embodiment, a lighting apparatus is provided. The lighting apparatus may include an optical waveguide arranged for optical coupling to at least one light source, the optical waveguide having at least one input region for a source light to enter the optical waveguide for propagation within the optical waveguide, and a plurality of light interacting structures arranged within the optical waveguide, the plurality of light interacting structures adapted to interact with the source light to provide an illumination light emitted from the optical waveguide to an ambient environment, wherein a concentration of the plurality of light interacting structures increases, along a length portion of the optical waveguide, in a direction away from the at least one input region.

According to an embodiment, a method of forming a lighting apparatus is provided. The method may include forming an optical waveguide, connecting at least one light source to the optical waveguide at an at least one input region of the optical waveguide, the at least one light source configured to provide a source light to enter the optical waveguide through the at least one input region for propagation within the optical waveguide, and forming a plurality of light interacting structures within the optical waveguide, the plurality of light interacting structures adapted to interact with the source light to provide an illumination light emitted from the optical waveguide to an ambient environment, wherein a concentration of the plurality of light interacting structures increases, along a length portion of the optical waveguide, in a direction away from the at least one input region.

According to an embodiment, a method of forming a lighting apparatus is provided. The method may include forming an optical waveguide, the optical waveguide having a cladding and a hollow core region surrounded by the cladding, connecting at least one light source to the optical waveguide at an at least one input region of the optical waveguide, the at least one light source configured to provide a source light to enter the optical waveguide through the at least one input region for propagation within the hollow core region, and forming a plurality of light interacting structures on at least one inner surface of the cladding, the plurality of light interacting structures adapted to interact with the source light to provide an illumination light emitted from the optical waveguide to an ambient environment.

According to an embodiment, a method of forming a lighting apparatus is provided. The method may include forming an optical waveguide for optical coupling to at least one light source, the optical waveguide having at least one input region for a source light to enter the optical waveguide for propagation within the optical waveguide, and forming a plurality of light interacting structures within the optical waveguide, the plurality of light interacting structures adapted to interact with the source light to provide an illumination light emitted from the optical waveguide to an ambient environment, wherein a concentration of the plurality of light interacting structures increases, along a length portion of the optical waveguide, in a direction away from the at least one input region.

BRIEF DESCRIPTION OF THE DRAWINGS

In the drawings, like reference characters generally refer to like parts throughout the different views. The drawings are not necessarily to scale, emphasis instead generally being placed upon illustrating the principles of the invention. In the following description, various embodiments of the invention are described with reference to the following drawings, in which:

FIG. 1E shows a flow chart illustrating a method of forming a lighting apparatus, according to various embodiments.

FIG. 1F shows a flow chart illustrating a method of forming a lighting apparatus, according to various embodiments.

DETAILED DESCRIPTION

Figure 1A:
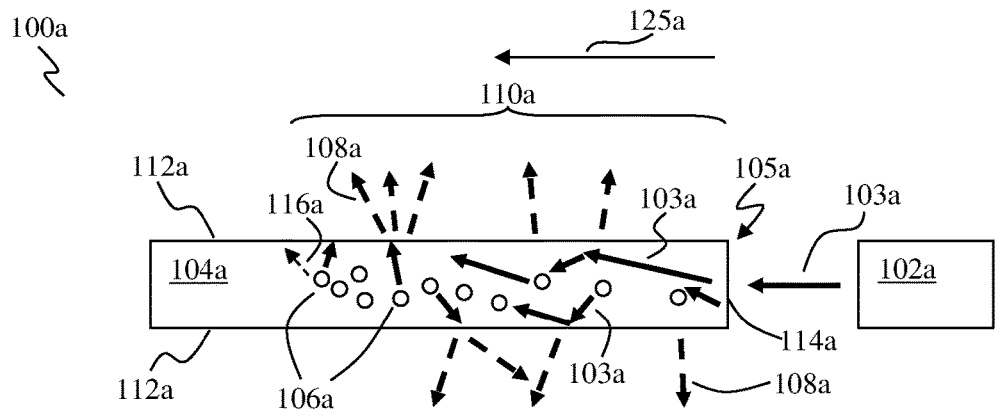
FIG. 1A shows schematic side views of a lighting apparatus, according to various embodiments.
Figure 1A:
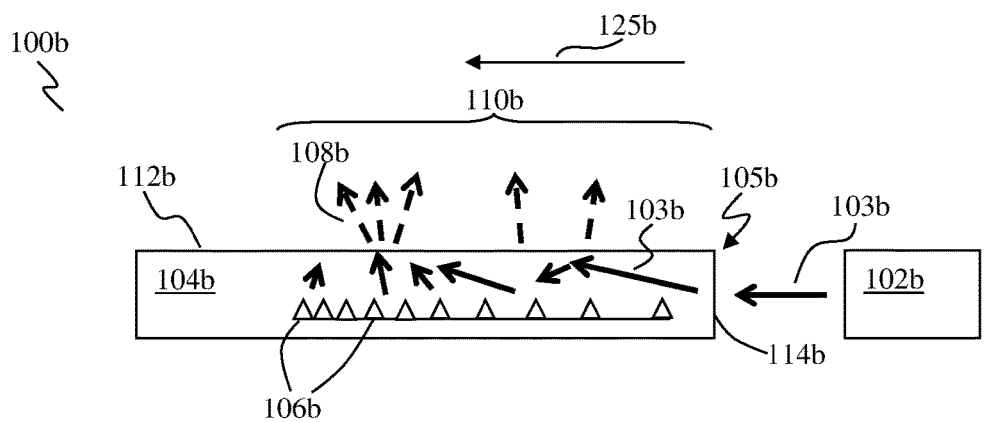

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Embodiments described in the context of one of the methods or devices are analogously valid for the other methods or devices. Similarly, embodiments described in the context of a method are analogously valid for a device, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

In the context of various embodiments, the phrase "at least substantially" may include "exactly" and a reasonable variance.

In the context of various embodiments, the term "about" as applied to a numeric value encompasses the exact value and a reasonable variance.

As used herein, the term "and/or" includes any and all combinations of one or more of the associated listed items.

As used herein, the phrase of the form of "at least one of A or B" may include A or B or both A and B. Correspondingly, the phrase of the form of "at least one of A or B or C", or including further listed items, may include any and all combinations of one or more of the associated listed items.

Various embodiments may provide lighting or a lighting apparatus for façade applications using a waveguide (e.g., a polymer waveguide) and edge lighting.

Various embodiments may provide an alternative way of lighting by replacing the LED bars of prior art devices with a flexible light illuminating (optical) waveguide that may use one or more LEDs or one or more laser diodes (LDs) for edge lighting. The illuminating waveguide may have a solid form containing distributed scatterers or fluorophores to achieve uniform side illumination. Alternatively, the (optical) waveguide may have a hollow core in the centre with a reflecting or scattering plane in one or multiple sides of the waveguide. The light may propagate along the hollow core, and be reflected or scattered by the plane(s) for uniform side illumination. The inner wall(s) of the waveguide may be micro-patterned to enhance light scattering.

High power LEDs or LDs may be used as a light source. Hereinafter as described, LED may represent the light source used in various embodiments, but it should be appreciated that the LED may be replaceable with one or more LDs. In various embodiments, one or more LEDs may be located at or in the end facet(s) of the waveguide for edge lighting. The waveguide may be large enough for efficient coupling from the high power LED(s). The high power LED or LEDs in conjunction with the large size waveguide may ensure high luminance sufficient for façade lighting. If any of the LEDs fail, the LED chip could be individually accessed and replaced without disturbing the whole illuminating structure. Consequently, this may significantly cut down the maintenance cost, and also the electric bill, by reducing the number of LEDs compared to the known LED strip. In addition, the waveguide may be flexible, and may be produced in any arbitrary shape to fulfil any lighting need for façade lighting applications.

As described above and hereafter, in various embodiments, it may be possible to use a large waveguide with high power LED(s) or LD(s), which may scale up luminance beyond what the current illuminating waveguides can offer.

For façade lighting application, the known LED strip is the only product available in the current market. The LED strip suffers from the aforementioned issues, and end users are eager to find new technology to get away from the problems. It is possible to replace the LED strip with an illuminating waveguide with, for example, a high power LED (or LD) edge lighting, as described herein for various embodiments. If the edge lighting LED and/or the waveguide needs replacement, the individual component may be accessed for the maintenance. The waveguide may be fabricated by an extrusion technique, and the manufacturing cost is much cheaper than that for the LED strip. The extrusion technique is versatile and allows fabricating various geometries including circle, square, ribbon, polygonal shapes, etc. Also, the number of LEDs may be reduced by an order of magnitude without compromising the luminance compared to the known LED strip. Thus, various embodiments may substantially cut down the ownership cost.

Compared to the existing illuminating waveguide technologies, in various embodiments, it is possible to scale up the luminous efficacy sufficient for façade lighting application. This allows using a larger illuminating (optical) waveguide with scatterers or fluorophores properly positioned and compositionally optimised to enhance the luminance. The larger waveguide also permits the use of high power LEDs or LDs, for example, for edge lighting. The combination of the high power LEDs (or LDs), and the spatially and/or compositionally optimised scattering points may increase the luminous efficacy in the waveguide. Alternatively, the (optical) waveguide may have a hollow core in the centre to minimise absorption loss by the waveguide material itself. The hollow core waveguide may have a micro-pattern or reflecting layer on a surface of a wall(s) of the waveguide to efficiently scatter the light. Hence, the launched light from LEDs (or LDs) may be substantially or completely scattered and not be wasted by the waveguide material absorption. This may enhance the luminance in a large illuminating waveguide.

Further, there may be undesired strong light scattering at the LED coupling end of the waveguide. This scattering creates a bad impression of non-uniform illumination in a large scale lighting. To avoid or at least minimise the coupling scattering, it may be possible to include a LED coupling rig (as will be described further below as non-limiting examples with reference to FIG. 4A). The coupling rig may first capture the wide spreading emission of the LED by surrounding the LED with one or more reflective surfaces. The captured light may be directed to a collecting lens, and may be focused or collimated by the lens to the waveguide. The surrounding surfaces after the lens may be changed to or provided with one or more absorbing materials or absorbing regions to stop or minimise stray light from being scattered at the interface between the coupling rig and the waveguide. As a result, LED emission may be coupled to the waveguide with minimal or without the strong scattering effect, and any emission above the capturing angle of the lens may be absorbed by the surrounding surfaces in the coupling rig by the absorbing material(s)/region(s). Current technologies do not consider the scattering effect at the coupling ends.

The LED coupling rig and the waveguide may be separately installed at the construction sites or installation sites. This consideration is due to the rough handlings at the construction sites. The LED embedded waveguide designs in the prior art are too delicate to be installed during the architecture construction. Furthermore, the LED embedded waveguide requires trained expertise for installation as well as maintenance. Otherwise, the whole structure must be replaced just as for the current known LED bar. In contrast, the technique(s) in various embodiments provide a way or technology to allow individual access to the LED and/or the waveguide for easy installation and maintenance.

Various embodiments further provide methods of manufacturing the waveguide with an extrusion and a high temperature rolling technique, where details of the manufacturing processes would be described further below.

FIG. 1A shows schematic side views of a lighting apparatus 100a, 100b, according to various embodiments. The lighting apparatus 100a, 100b includes at least one light source 102a, 102b configured to provide a source light (represented by solid arrows 103a, 103b), an optical waveguide 104a, 104b optically coupled to the at least one light source 102a, 102b, the optical waveguide 104a, 104b having at least one input region 105a, 105b through which the source light 103a, 103b enters the optical waveguide 104a, 104b for propagation within the optical waveguide 104a, 104b, and a plurality of light interacting structures 106a, 106b arranged within the optical waveguide 104a, 104b, the plurality of light interacting structures 106a, 106b adapted to interact with the source light 103a, 103b to provide an illumination light (represented by dashed arrows 108a, 108b) emitted from the optical waveguide 104a, 104b to an ambient environment, wherein a concentration of the plurality of light interacting structures 106a, 106b increases, along a length portion 110a, 110b of the optical waveguide 104a, 104b, in a direction (represented by the arrows 125a, 125b) away from the at least one input region 105a, 105b.

In other words, a lighting apparatus 100a, 100b may be provided. The lighting apparatus 100a, 100b may include at least one light source 102a, 102b and an optical waveguide 104a, 104b optically coupled to one another so that the source light 103a, 103b generated by the at least one light source 102a, 102b is received by the optical waveguide 104a, 104b, where the source light 103a, 103b may then propagate in the optical waveguide 104a, 104b. The source light 103a, 103b may be transmitted from the at least one light source 102a, 102b into the optical waveguide 104a, 104b via at least one input region 105a, 105b of the optical waveguide 104a, 104b. This may mean that the at least one input region 105a, 105b is the point or region of entry of the source light 103a, 103b into the optical waveguide 104a, 104b. As a non-limiting example, the source light 103a, 103b may be arranged adjacent to the at least one input region 105a, 105b. While the at least one input region 105a, 105b is illustrated in FIG. 1A as an end region of the optical waveguide 104a, 104b, it should be appreciated that the at least one input region 105a, 105b may be at any part or portion of the optical waveguide 104a, 104b, including, for example, at a central portion of the optical waveguide 104a, 104b.

The optical waveguide 104a, 104b may be made of a transparent material, e.g., an optically transparent material. For example, the (optically) transparent material may be optically transmissive to an electromagnetic radiation of the visible light spectrum.

A plurality of light interacting structures 106a, 106b may be formed or disposed within the optical waveguide 104a, 104b. The source light 103a, 103b propagating within the optical waveguide 104a, 104b may be incident on the plurality of light interacting structures 106a, 106b. Interaction between the plurality of light interacting structures 106a, 106b and the source light 103a, 103b may occur so as to provide or generate an illumination light 108a, 108b that is emitted from the optical waveguide 104a, 104b to an ambient or surrounding environment to provide lighting. This may mean that the illumination light 108a, 108b is external to the optical waveguide 104a, 104b that illuminates the ambient environment.

As a non-limiting example, as a result of the interaction between the plurality of light interacting structures 106a, 106b and the source light 103a, 103b, the plurality of light interacting structures 106a, 106b may provide an intermediate light (such as the source light 103a, 103b that has been scattered and/or reflected by the plurality of light interacting structures 106a, 106b), from which the illumination light 108a, 108b may be emitted from the optical waveguide 104a, 104b to the ambient environment. The intermediate light may pass through a peripheral surface or side surface 112a, 112b of the optical waveguide 104a, 104b to form the illumination light 108a, 108b. This may mean that the illumination light 108a, 108b may be based on the intermediate light that is in turn produced in response to the interaction between the source light 103a, 103b and the plurality of light interacting structures 106a, 106b.

The plurality of light interacting structures 106a, 106b may be arranged such that a concentration (or distribution or density) of the plurality of light interacting structures 106a, 106b increases, along a length portion 110a, 110b of the optical waveguide 104a, 104b, in a (longitudinal) direction 125a, 125b away from the at least one input region 105a, 105b. The term "length portion" may mean a portion of the optical waveguide 104a, 104b over a length of the optical waveguide 104a, 104b. The length portion 110a, 110b may mean the portion of the optical waveguide 104a, 104b over the entire length or over a part of the length of the optical waveguide 104a, 104b.

In various embodiments, the plurality of light interacting structures 106a, 106b may be arranged with a concentration (or distribution or density) that increases, along the length portion 110a, 110b, in the (longitudinal) direction 125a, 125b away from the at least one input region 105a, 105b such that the illumination light 108a, 108b provides at least substantially uniform illumination over the length portion 110a, 110b. This may mean that the illumination light 108a, 108b that is emitted by the lighting apparatus 100a, 100b provides at least substantially uniform illumination over the length portion 110a, 110b. The uniform illumination may be in terms of uniform intensity or uniform luminance.

As may be appreciated, the intensity of the source light 103a, 103b generally may decrease in the direction 125a, 125b away from the at least one input region 105a, 105b through which the source light 103a, 103b enters the optical waveguide 104a, 104b. By having an arrangement of the plurality of light interacting structures 106a, 106b where the number, and hence the concentration, of the plurality of light interacting structures 106a, 106b, increases along the length portion 110a, 110b in the direction 125a, 125b, a higher number of the light interacting structures 106a, 106b are available to interact with the source light 103a, 103b at a part of the optical waveguide 104a, 104b where the intensity of the source light 103a, 103b may be lower as compared to another part of the optical waveguide 104a, 104b where the intensity of the source light 103a, 103b may be higher. In this way, the increased concentration of the plurality of light interacting structures 106a, 106b may compensate for the decreased intensity of the source light 103a, 103b by enabling a higher extraction efficiency of the source light 103a, 103b at the part of the optical waveguide 104a, 104b where the intensity of the source light 103a, 103b may be lower. Such an arrangement of the plurality of light interacting structures 106a, 106b may enable uniform illumination to be achieved. This may mean that at least substantially uniform illumination may be achieved as a result of the distribution profile of the plurality of light interacting structures 106a, 106b over the length portion 110a, 110b.

In various embodiments, the concentration of the plurality of light interacting structures 106a, 106b may increase along an entire length of the optical waveguide 104a, 104b. In various embodiments, such an arrangement may enable at least substantially uniform illumination to be provided over the entire length of the optical waveguide 104a, 104b.

In various embodiments, the concentration of the plurality of light interacting structures 106a, 106b along the length portion 110a, 110b may be provided based on an inverse relationship with the intensity of the source light 103a, 103b within the optical waveguide 104a, 104b. By having such a relationship, the illumination light 108a, 108b emitted from the optical waveguide 104a, 104b may provide at least substantially uniform illumination over the length portion 110a, 110b.

In various embodiments, generally, light may be transmitted or provided from within the optical waveguide 104a, 104b through the peripheral surface 112a, 112b of the optical wavelength 104a, 104b over the length portion 110a, 110b so as to provide the illumination light 108a, 108b. The peripheral surface 112a, 112b may be a side surface of the optical waveguide 104a, 104b. As a non-limiting example, the peripheral surface 112a, 112b may be a circumferential surface or part thereof of the optical waveguide 104a, 104b. The peripheral surface 112a, 112b of the optical waveguide 104a, 104b may be at least substantially transverse or orthogonal to at least one end facet 114a, 114b of the optical waveguide 104a, 104b. In this way, side illumination may be achieved.

In various embodiments, the source light 103a, 103b may enter the optical waveguide 104a, 104b via a single input region 105a, 105b.

In the context of various embodiments, the source light 103a, 103b may include an electromagnetic radiation including, but not limited to, the visible light spectrum, the ultraviolet region or the infrared region. For example, the source light 103a, 103b may have a wavelength of between about 400 nm and about 700 nm.

In the context of various embodiments, the illumination light 108a, 108b may include an electromagnetic radiation including or consisting of the visible light spectrum (e.g., a wavelength of between about 400 nm and about 700 nm).

In various embodiments, a concentration (or distribution or density) of the plurality of light interacting structures 106a, 106b may increase in a transverse direction (or cross-sectional direction) from an outer region of the optical waveguide 104a, 104b to an inner region of the optical waveguide 104a, 104b. The outer region of the optical waveguide 104a, 104b may mean a region proximal to the perimeter or boundary of the optical waveguide 104a, 104b, while the inner region of the optical waveguide 104a, 104b may mean a central region of the waveguide 104a, 104b or a region proximal to the central axis of the optical waveguide 104a, 104b. As an example, the transverse direction may be a radial direction.

In various embodiments, the concentration of the plurality of light interacting structures 106a, 106b in the transverse direction may follow a Gaussian profile (or distribution) or a parabolic profile (or distribution) or a top-hat profile (or distribution).

As may be appreciated, the intensity or beam profile of the source light 103a, 103b within the optical waveguide 104a, 104b generally may be higher at the inner region of the optical waveguide 104a, 104b (e.g., the intensity increases from the outer region of the optical waveguide 104a, 104b to the inner region of the optical waveguide 104a, 104b). By having an arrangement of the plurality of light interacting structures 106a, 106b where the number, and hence the concentration, of the plurality of light interacting structures 106a, 106b, increases in the transverse direction from the outer region to the inner region, a higher number of the light interacting structures 106a, 106b are available to interact with the source light 103a, 103b at the inner region of the optical waveguide 104a, 104b where the intensity of the source light 103a, 103b may be higher so as to achieve a higher extraction efficiency of the source light 103a, 103b from the inner region of the optical waveguide 104a, 104b.

In various embodiments, the at least one light source 102a, 102b and the optical waveguide 104a, 104b may be physically connected to each other.

In various embodiments, the at least one light source 102a, 102b and the optical waveguide 104a, 104b may be separably connected to each other. This may mean that the at least one light source 102a, 102b and the optical waveguide 104a, 104b may be separate entities or separate units (e.g., separately manufactured) which may then be assembled or connected to each other. In this way, for example, when the at least one light source 102a, 102b or the optical waveguide 104a, 104b becomes faulty, the corresponding faulty item or unit may be separately replaced.

In various embodiments, the at least one input region 105a, 105b may include at least one end region of the optical waveguide 104a, 104b. In various embodiments, the at least one input region 105a, 105b may include at least one end facet 114a, 114b of the optical waveguide 104a, 104b. This may mean that the source light 103a, 103b may enter the optical waveguide 104a, 104b through the at least one end facet 114a, 114b. In this way, the at least one light source 102a, 102b may provide edge lighting to the optical waveguide 104a, 104b.

In various embodiments, the at least one light source 102a, 102b may be (separably) connected to the at least one end facet 114a, 114b of the optical waveguide 104a, 104b.

In various embodiments, the lighting apparatus 100a, 100b may include two light sources (e.g., one of which may be the light source 102a, 102b) respectively arranged at (or connected to) opposite end facets (e.g., one of which may be the end facet 114a, 114b) of the optical waveguide 104a, 104b, the two light sources configured to provide the source light 103a, 103b, and wherein the concentration of the plurality of light interacting structures 106a, 106b may increase, along the length portion 110a, 110b of the optical waveguide 104a, 104b, in a respective (longitudinal) direction away from each of the opposite end facets. By having such an arrangement of the plurality of light interacting structures 106a, 106b, with the concentration of the plurality of light interacting structures 106a, 106b increasing in the respective (longitudinal) direction away from each of the opposite end facets, the illumination light 108a, 108b may provide at least substantially uniform illumination over the length portion 110a, 110b. The concentration of the plurality of light interacting structures 106a, 106b may increase, from each of the opposite end facets, towards a central portion of the optical waveguide 104a, 104b. In this way, the concentration of the plurality of light interacting structures 106a, 106b may reach a maximum at the central portion of the optical waveguide 104a, 104b. In various embodiments, the concentration of the plurality of light interacting structures 106a, 106b along the length portion 110a, 110b may follow a Gaussian profile (or distribution) or a parabolic profile (or distribution) or a top-hat profile (or distribution). In various embodiments, each light source of the two light sources may include a light source unit or a plurality of light source units (e.g., an array of light source units), where each light source unit may be a light emitting diode (LED) or a laser diode (LD).

In various embodiments, the optical waveguide 104a, 104b, may further include a (light) diffusion layer. The diffusion layer may diffuse light to promote even or uniform illumination. The diffusion layer may be arranged over the length portion 110a, 110b of the optical waveguide 104a, 104b. The diffusion layer may be provided on an outer surface or the peripheral surface 112a, 112b. The diffusion layer may at least substantially surround the optical waveguide 104a, 104b, for example, around the entire perimeter of the optical waveguide 104a, 104b.

In various embodiments, the lighting apparatus 100a, 100b may further include a coupling assembly (or coupling jig) connected to the optical waveguide 104a, 104b, the at least one light source 102a, 102b being received in the coupling assembly. The coupling assembly may be separably connected to the optical waveguide 104a, 104b. The coupling assembly may be connected at the at least one input region 105a, 105b.

In various embodiments, the coupling assembly may include a housing to receive the at least one light source 102a, 102b, the housing having at least one reflective inner surface to reflect the source light 103a, 103b towards the optical waveguide 104a, 104b.

The housing may have an internal hollow or solid structure. The at least one reflective inner surface may include a mirror or a metallic reflector layer.

The source light 103a, 103b may be emitted by the at least one light source 102a, 102b over a large or wide angle and by providing the housing with the at least one reflective inner surface, most or all of the source light 103a, 103b may be reflected by the at least one reflective inner surface towards the optical waveguide 104a, 104b. In various embodiments, all inner surfaces of the housing may be reflective. This may mean that the at least one light source 102a, 102b may be surrounded (on all sides) by reflective surfaces.

In various embodiments, the coupling assembly may further include at least one light absorption region arranged proximal to the at least one input region 105a, 105b of the optical waveguide 104a, 104b. The at least one light absorption region may absorb light, for example, any stray light that may be present. For example, the at least one light absorption region may minimise or prevent stray light from being scattered at an intermediate region between the coupling assembly and the optical waveguide 104a, 104b, for example, at an interface between the coupling assembly and the optical waveguide 104a, 104b. The at least one light absorption region may be arranged between the at least one light source 102a, 102b and the at least one input region 105a, 105b of the optical waveguide 104a, 104b. In this way, the at least one light source 102a, 102b may be arranged distal to the at least one input region 105a, 105b.

In various embodiments, the coupling assembly may further include an optical lens (or collecting lens) to focus or collimate the source light 103a, 103b into the optical waveguide 104a, 104b. The optical lens may be arranged prior to the at least one light absorption region. In this way, the at least one light absorption region may minimise or prevent stray light from being scattered at an intermediate region between the coupling assembly and the optical waveguide 104a, 104b (e.g., at an interface between the coupling assembly and the optical waveguide 104a, 104b). Further, the at least one light absorption region may absorb any emission or light that may be incident on the lens at an angle above the capturing angle of the lens, and which therefore may not be focused by the lens into the optical waveguide 104a, 104b, resulting in stray light.

In various embodiments, the lighting apparatus 100a, 100b may further include a locking mechanism to secure the coupling assembly to the optical waveguide 104a, 104b. The locking mechanism may include complementary structures that cooperate or mate to secure the coupling assembly and the optical waveguide 104a, 104b to one another. The complementary structures may be respectively provided at the coupling assembly and at the optical waveguide 104a, 104b. The locking mechanism may include a thread-type mechanism, a click-type mechanism or a snap fit-type mechanism.

In the context of various embodiments, the at least one light source 102a, 102b may include at least one light emitting diode (LED) or at least one laser diode (LD).

In the context of various embodiments, the at least one light source 102a, 102b may have a lumen rating of between about 200 lm (lumen) and about 2000 lm, for example, between about 200 lm and about 1000 lm, between about 200 lm and about 500 lm, between about 500 lm and about 2000 lm, between about 1000 lm and about 2000 lm, or between about 500 lm and about 1500 lm. Therefore, at least one high lumen or high power light source may be used.

In the context of various embodiments, the optical waveguide 104a, 104b may be at least substantially flexible.

In the context of various embodiments, the optical waveguide 104a, 104b may be made of a material suitable for extrusion. In this way, the optical waveguide 104a, 104b may be formed via an extrusion process.

In the context of various embodiments, the optical waveguide 104a, 104b may be made of a polymer, a resin or a thermoplastic. It should be appreciated that each of the polymer, resin or thermoplastic may be (optically) transparent. The use of resins or thermoplastics as the waveguide material may be suitable for forming the optical waveguide via a sol-gel process or a 3D printing process.

In the context of various embodiments, the optical waveguide 104a, 104b may have a cross sectional dimension of between about 1 mm and about 20 mm, for example, between about 1 mm and about 10 mm, between about 1 mm and about 5 mm, between about 5 mm and about 10 mm, between about 5 mm and about 20 mm, or between about 10 mm and about 20 mm. In this way, a large size optical waveguide may be provided. A large size optical waveguide may allow the lighting apparatus 100a, 100b to provide a high luminance as the amount of the source light 103a, 103b coupled into the optical waveguide 104a, 104b may be proportional to the size or volume of the optical waveguide 104a, 104b, and, consequently, the luminance of the resulting illumination light 108a, 108b may be higher. The term "cross sectional dimension" may mean the longest straight-line distance between two points of the boundary (e.g., circumference, perimeter, etc.) of the cross-section.

In the context of various embodiments, the length portion 110a, 110b of the optical waveguide 104a, 104b may be at least 0.5 m. (i.e., ≥0.5 m), e.g., at least 1 m, at least 2 m or at least 5 m.

In the context of various embodiments, the optical waveguide 104a, 104b may include a cylindrical waveguide, a rod waveguide or a planar waveguide (e.g., in the form/shape of a ribbon or a sheet).

In the context of various embodiments, the optical waveguide 104a, 104b may have a cross-sectional shape of a circle, an ellipse, a rectangle, a square, or a triangle. However, it should be appreciated that the optical waveguide 104a, 104b may have any suitable cross-sectional polygonal shape.

In the context of various embodiments, the lighting apparatus 100a, 100b may be configured to provide the illumination light 108a, 108b having a luminance of between about 1000 cd (candela) and about 10000 cd, for example, between 1000 cd and about 5000 cd, between 1000 cd and about 3000 cd, between 5000 cd and about 10000 cd, or between 3000 cd and about 5000 cd.

For ease of understanding, the lighting apparatus 100a will now be used to illustrate various embodiments having an optical waveguide with a solid core region (e.g., a "solid core waveguide"). In various embodiments, the optical waveguide 104a may include a solid core region, and the plurality of light interacting structures 106a may be arranged within the solid core region. The source light 103a may propagate within the solid core region. The optical waveguide 104a may be free of a cladding. In various embodiments, the optical waveguide 104a having the solid core region may provide a 360° illumination.

The number of the plurality of light interacting structures 106a increases in the (longitudinal) direction 125a away from the at least one input region 105a. Such an arrangement of the plurality of light interacting structures 106a results in the concentration of the plurality of light interacting structures 106a increasing in the direction 125a away from the at least one input region 105a.

The plurality of light interacting structures 106a may include at least one of scatterers to scatter the source light 103a through a peripheral surface 112a of the optical waveguide 104a over the length portion 110a of the optical waveguide 104a to form the illumination light 108a, or fluorophores to absorb the source light 103a, and, in response to the absorption, to generate (or emit) a resultant light (represented, as an example, by the dashed arrow 116a) that is transmitted through a peripheral surface 112a of the optical waveguide 104a over the length portion 110a of the optical waveguide 104a to form the illumination light 108a. As further details, the source light 103a may be incident on the scatterers which may then scatter the source light 103a in different directions. The fluorophores may absorb the source light 103a and consequently emit the resultant light 116a (e.g., fluorescence generated by the fluorophores). The fluorophores may absorb the source light 103a of a predetermined wavelength (or wavelength range) and consequently emits a resultant light 116a of a different wavelength (or wavelength range). Therefore, the fluorophores may shift the wavelength of the resultant light 116a from that of the source light 103a so as to provide an illumination light 108a that may have a colour different to that of the source light 103a.

In various embodiments, at least one of the scatterers or the fluorophores may include nanoparticles, microparticles, quantum dots or gas bubbles (e.g., air bubbles). The term "scatterers" may mean scattering centers or scattering structures.

In various embodiments, at least one of the scatterers or the fluorophores may include a polymer, a metal, a dielectric material or a semiconductor material.

In various embodiments, at least one of the scatterers or the fluorophores may be made of a material (e.g., as described above) that has a refractive index that is different from that of the material of the optical waveguide 104a.

In various embodiments, the optical waveguide 104a may further include at least one (micro)pattern (or arrangement) of peaks and valleys defined in the solid core region to scatter or reflect the source light 103a through the peripheral surface 112a of the optical waveguide 104a over the length portion 110a to form the illumination light 108a. Such a (micro)pattern of peaks and valleys may be similar to the plurality of protruding structures to be described further below in the context of an optical waveguide having a hollow core region.

For ease of understanding, the lighting apparatus 100b will now be used to illustrate various embodiments having an optical waveguide including a cladding and a hollow core region (e.g., a "hollow core waveguide"). In various embodiments, the optical waveguide 104b may include a cladding and a hollow core region surrounded by the cladding, and the plurality of light interacting structures 106b may be arranged on at least one inner surface (or inner wall) of the cladding. This may mean that the plurality of light interacting structures 106b may be arranged at the cladding-hollow core boundary. The plurality of light interacting structures 106b may be arranged in a layer or a plane at the at least one inner surface of the cladding. The hollow core region may be defined at a central region of the optical waveguide 104b. The source light 103b may propagate within the hollow core region. By having a hollow core region, there may be minimal absorption loss of the source light 103b, which otherwise may be absorbed by the waveguide material itself.

In various embodiments, the plurality of light interacting structures 106b may include a plurality of protruding structures (or peaks) extending from the at least one inner surface of the cladding, e.g., extending from the at least one inner surface of the cladding into the hollow core region. The plurality of protruding structures may be arranged in a linear arrangement. The plurality of protruding structures may be in the form of a micro-pattern. The plurality of protruding structures may be spaced apart from each other. A recess or valley may be arranged between adjacent protruding structures of the plurality of protruding structures. In this way, the plurality of protruding structures may define a (micro) pattern of peaks and valleys.

In various embodiments, a period between adjacent protruding structures of the plurality of protruding structures decreases, along the length portion 110b of the optical waveguide 104b, in the (longitudinal) direction 125b away from the at least one input region 105b of the optical waveguide 104b. Such an arrangement of the plurality of protruding structures results in the concentration of the plurality of protruding structures (plurality of light interacting structures) increasing in the direction 125b away from the at least one input region 105b. This may mean that the number of the plurality of protruding structures may increase in the direction 125b away from the at least one input region 105b. The period between adjacent protruding structures may mean the distance between the adjacent protruding structures, for example, the distance between the respective central axis of the adjacent protruding structures.

It should be appreciated that the plurality of protruding structures may themselves scatter or reflect the source light 103b, for example as a result of the arrangement/configuration of the plurality of protruding structures and/or material of the plurality of protruding structures and/or surface roughness or quality of the plurality of protruding structures. The plurality of protruding structures may provide scattering structures or reflecting structures, which may be arranged as a scattering or reflecting plane. As a non-limiting example, the plurality of protruding structures may be micro-reflectors.

In various embodiments, the plurality of protruding structures may include at least one of scatterers to scatter the source light, reflectors (e.g., mirrors) to reflect the source light, or fluorophores to absorb the source light, and, in response to the absorption, to generate a resultant light, to pass through a peripheral surface 112b of the optical waveguide 104b over the length portion 110b to form the illumination light 108b.

In various embodiments, each protruding structure of the plurality of protruding structures may have a cross-sectional shape of a triangle, a square or a rectangle. However, it should be appreciated that other types of polygonal shape may be suitable as the cross-sectional shape.

In various embodiments, the optical waveguide 104b may further include scatterers or fluorophores in the cladding.

In various embodiments, the optical waveguide 104b having the cladding and the hollow core region may provide illumination via a side of the optical waveguide 104b (or via the peripheral surface 112b) that is opposite to the inner surface of the cladding where the plurality of light interacting structures 106b may be arranged.

In various embodiments, for the optical waveguide 104b having the cladding and the hollow core region, a (light) diffusion layer may be arranged on the peripheral surface 112b of the optical waveguide 104b (or an outer surface of the cladding) and/or on an inner surface of the cladding, that is opposite to the inner surface of the cladding where the plurality of light interacting structures 106b may be arranged.

Figure 1B:
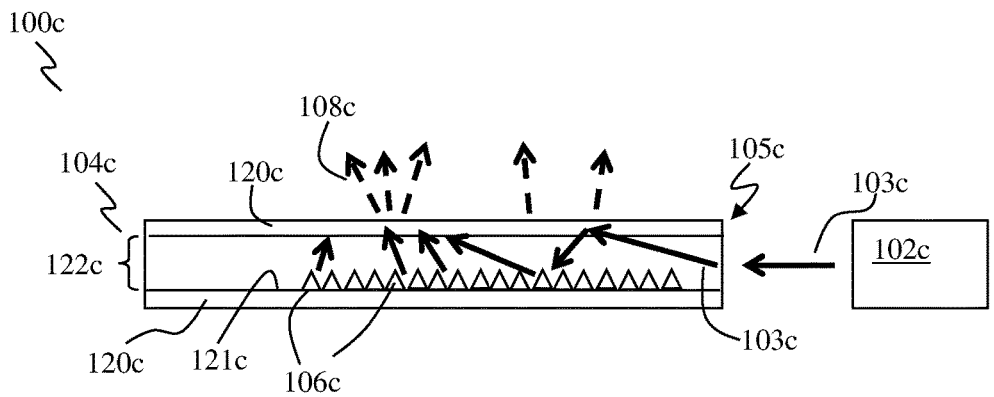
FIG. 1B shows a schematic side view of a lighting apparatus, according to various embodiments.

FIG. 1B shows a schematic side view of a lighting apparatus 100c, according to various embodiments. The lighting apparatus 100c includes at least one light source 102c configured to provide a source light (represented by solid arrows 103c), an optical waveguide 104c optically coupled to the at least one light source 102c, the optical waveguide 104c having a cladding 120c and a hollow core region 122c surrounded by the cladding 120c, wherein the optical waveguide 104c has at least one input region 105c through which the source light 103c enters the optical waveguide 104c for propagation within the hollow core region 122c, and a plurality of light interacting structures 106c arranged on at least one inner surface (or inner wall) 121c of the cladding 120c, the plurality of light interacting structures 106c adapted to interact with the source light 103c to provide an illumination light (represented by dashed arrows 108c) emitted from the optical waveguide 104c to an ambient environment. The at least one input region 105c may include at least one end facet of the optical waveguide 104c. The at least one light source 102c and/or the optical waveguide 104c and/or the plurality of light interacting structures 106c, including their respective arrangements or configurations, may be as described in the context of the lighting apparatus 100a, 100b. Further, structures, features, arrangements/configurations, parameters, sizes, characteristics, materials and operations as described in the context of the lighting apparatus 100a, 100b may be similarly applicable to the lighting apparatus 100c.

Figure 1C:
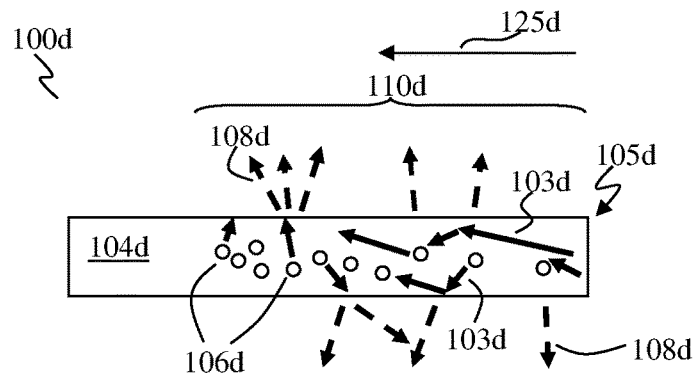
FIG. 1C shows a schematic side view of a lighting apparatus, according to various embodiments.

FIG. 1C shows a schematic side view of a lighting apparatus 100d, according to various embodiments. The lighting apparatus 100d includes an optical waveguide 104d arranged for optical coupling to at least one light source, the optical waveguide 104d having at least one input region 105d for a source light 103d (e.g., provided by the at least one light source for optical coupling to the optical waveguide 104d) to enter the optical waveguide 104d for propagation within the optical waveguide 104d, and a plurality of light interacting structures 106d arranged within the optical waveguide 104d, the plurality of light interacting structures 106d adapted to interact with the source light to provide an illumination light (represented by dashed arrows 108d) emitted from the optical waveguide 104d to an ambient environment, wherein a concentration of the plurality of light interacting structures 106d increases, along a length portion 110d of the optical waveguide 104d, in a direction (represented by the arrow 125d) away from the at least one input region 105d. The at least one input region 105d may include at least one end facet of the optical waveguide 104d. While the plurality of light interacting structures 106d are illustrated as, and may be similar to the plurality of light interacting structures 106a (FIG. 1A), it should be appreciated that the plurality of light interacting structures 106d may also be similar to the plurality of light interacting structures 106b (FIG. 1A). The optical waveguide 104d and/or the plurality of light interacting structures 106d, including their respective arrangements or configurations, may be as described in the context of the lighting apparatus 100a, 100b. Further, structures, features, arrangements/configurations, parameters, sizes, characteristics, materials and operations as described in the context of the lighting apparatus 100a, 100b may be similarly applicable to the lighting apparatus 100d.

The lighting apparatus 100a, 100b, 100c, 100d may be suitable for various applications, including, for example, applications that may require a high luminance or illumination during the day and/or night. As a non-limiting example, the lighting apparatus 100a, 100b, 100c, 100d may be suitable for façade lighting.

Figure 1D:
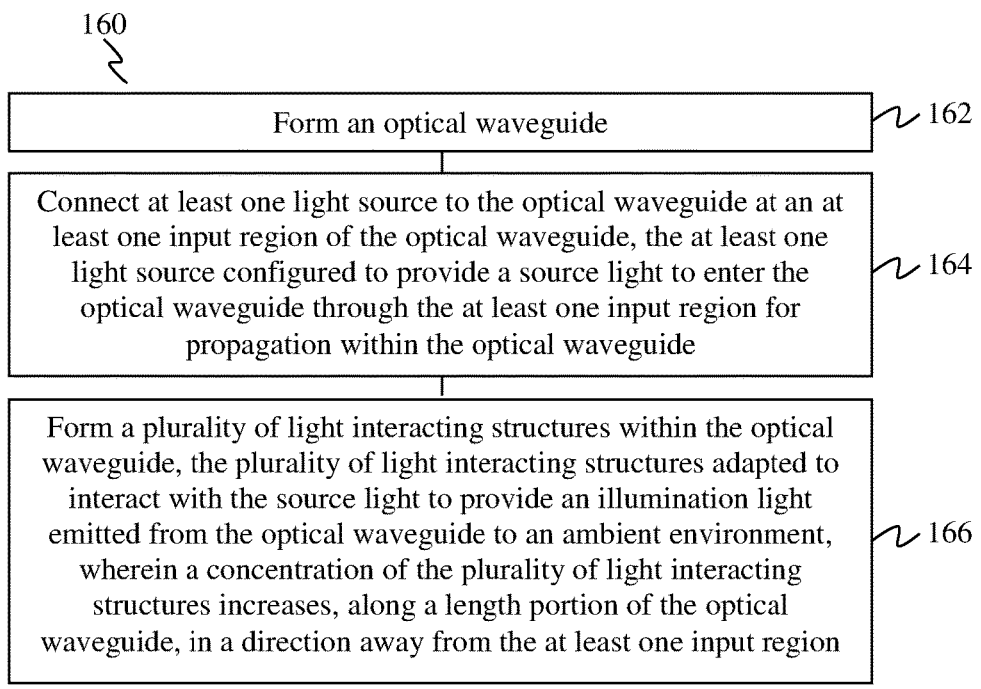
FIG. 1D shows a flow chart illustrating a method of forming a lighting apparatus, according to various embodiments.

FIG. 1D shows a flow chart 160 illustrating a method of forming a lighting apparatus, according to various embodiments.

At 162, an optical waveguide is formed.

At 164, at least one light source is connected to the optical waveguide at an at least one input region of the optical waveguide, the at least one light source configured to provide a source light to enter the optical waveguide through the at least one input region for propagation within the optical waveguide. The at least one light source may be physically connected to the optical waveguide. In various embodiments, the at least one input region may include at least one end facet of the optical waveguide.

At 166, a plurality of light interacting structures are formed within the optical waveguide, the plurality of light interacting structures adapted to interact with the source light to provide an illumination light emitted from the optical waveguide to an ambient environment, wherein a concentration of the plurality of light interacting structures increases, along a length portion of the optical waveguide, in a (longitudinal) direction away from the at least one input region. In various embodiments, the concentration (or distribution or density) may increase, along the length portion in the (longitudinal) direction away from the at least one input region such that the illumination light provides at least substantially uniform illumination over the length portion.

In various embodiments, the steps of forming an optical waveguide at 162 and forming a plurality of light interacting structures within the optical waveguide at 166 may be carried out together or simultaneously, for example in one single process, or may be carried out in separate processes.

In various embodiments, a concentration (or distribution or density) of the plurality of light interacting structures may increase in a transverse direction (or cross-sectional direction) from an outer region of the optical waveguide to an inner region of the optical waveguide. In various embodiments, the concentration of the plurality of light interacting structures in the transverse direction may follow a Gaussian profile (or distribution) or a parabolic profile (or distribution) or a top-hat profile (or distribution).

In various embodiments, at 164, the at least one light source may be separably connected to the optical waveguide.

In various embodiments, at 164, two light sources may be respectively connected at opposite end facets of the optical waveguide, the two light sources configured to provide the source light, and, at 166, the plurality of light interacting structures may be formed such that the concentration of the plurality of light interacting structures increases, along the length portion of the optical waveguide, in a respective (longitudinal) direction away from each of the opposite end facets. In various embodiments, by having such an arrangement of the plurality of light interacting structures with the concentration increasing in the respective (longitudinal) direction away from each of the opposite end facets, the illumination light may provide at least substantially uniform illumination over the length portion. In various embodiments, the concentration of the plurality of light interacting structures 106a, 106b along the length portion 110a, 110b may follow a Gaussian profile (or distribution) or a parabolic profile (or distribution) or a top-hat profile (or distribution).

In various embodiments, the optical waveguide may be formed using a casting process or a roller pressing process to form a planar optical waveguide, and the plurality of light interacting structures may be provided to the planar optical waveguide during the casting process or the roller pressing process so as to form the plurality of light interacting structures within the planar optical waveguide.

In various embodiments, in order to form the optical waveguide, a waveguide preform may be formed, and the waveguide preform may be subjected to an extrusion process to form the optical waveguide. The extrusion process may be carried out using an extrusion rig, where the waveguide preform may be provided into an extrusion chamber or container of the extrusion rig. It should be appreciated that the term "waveguide preform" may refer to a substance or a structure prior to formation into an optical waveguide.

In various embodiments, the extrusion process may include extruding, from the waveguide preform, the optical waveguide through an extrusion die. In other words, the waveguide preform may be passed through or forced through the extrusion die to extrude the optical waveguide. The extrusion die may have a predetermined exit opening size and/or cross sectional shape/configuration that may be transferred to the extruded optical waveguide as the waveguide preform passes through the extrusion die to be extruded as the optical waveguide. The waveguide preform may be, for example, in the form of a molten material of the waveguide preform, or may include a raw material, e.g., of a polymer, a resin or a thermoplastic. This may mean that, in various embodiments, an optical waveguide may be extruded directly from one or more raw materials of a polymer, a resin or a thermoplastic.

In various embodiments, to form the waveguide preform, a molten material of the waveguide preform may be provided to fill an extrusion chamber (or container) for forming the optical waveguide having a solid core region. The molten material may fill the extrusion chamber, to form a bulk waveguide preform, meaning that the molten material in the extrusion chamber may be without a hollow region therewithin such that an optical waveguide with a solid core region may be extruded. The plurality of light interacting structures may be provided to the molten material for forming the plurality of light interacting structures within the optical waveguide. In further embodiments, it should be appreciated that the molten material of the waveguide preform may be replaced by one or more raw materials (e.g., a polymer, a resin or a thermoplastic) to be directly extruded for forming the optical waveguide having a solid core region.

In various embodiments, to form the waveguide preform, a plurality of sheets of waveguide material may be formed, the plurality of sheets may then be stacked one over the other, and the stack of the plurality of sheets may be rolled into a compact rolled preform. The compact rolled preform may be subjected to the extrusion process to form the optical waveguide having a solid core region. The compact rolled preform may be provided to the extrusion chamber (or container) for extrusion. The term "compact rolled preform" means a dense rolled preform or a rolled preform without a hollow portion therewithin. In this way, the compact rolled preform may correspond to the solid core region of the optical waveguide that is extruded.

In various embodiments, in order to form the plurality of light interacting structures within the optical waveguide, the plurality of light interacting structures are provided within individual sheets of the plurality of sheets when forming the plurality of sheets. The plurality of light interacting structures may be provided prior to stacking the plurality of sheets. In this way, the plurality of light interacting structures may be provided within the solid core region when the optical waveguide is extruded.

In various embodiments, the plurality of light interacting structures may include at least one of scatterers to scatter the source light through a peripheral surface of the optical waveguide over the length portion of the optical waveguide to form the illumination light, or fluorophores to absorb the source light, and, in response to the absorption, to generate (or emit) a resultant light that is transmitted through a peripheral surface of the optical waveguide over the length portion of the optical waveguide to form the illumination light.

In various embodiments, the method may further include patterning an arrangement of peaks and valleys on a surface of individual sheets of the plurality of sheets.

In various embodiments, to form the waveguide preform, a molten material of the waveguide preform may be provided into an extrusion chamber (or container) to form a ring preform for forming the optical waveguide having a cladding and a hollow core region surrounded by the cladding. The plurality of light interacting structures may be formed during the extrusion process, wherein an extrusion die used in the extrusion process has an exit opening with a predetermined structural pattern for forming the plurality of light interacting structures having a complementary pattern to the structural pattern on an inner surface (or inner wall) of the cladding of the optical waveguide that is extruded. The term "ring preform" may mean a preform having a shape/configuration like a ring (or ring portion) with a hollow portion therewithin. In this way, the ring portion and the hollow portion of the ring preform may correspond respectively to the cladding and the hollow core region of the optical waveguide that is extruded. The ring portion may be of any shape, including, for example, a circle or a square. As an example for forming the ring preform, the extrusion chamber, for example, may have a solid inner central portion where the molten material may not be provided so as to define the hollow portion of the ring preform. In further embodiments, it should be appreciated that the molten material of the waveguide preform may be replaced by one or more raw materials (e.g., a polymer, a resin or a thermoplastic) to be directly extruded for forming the optical waveguide having a cladding and a hollow core region surrounded by the cladding.

In various embodiments, to form the waveguide preform, at least one sheet of waveguide material may be formed, and the at least one sheet of waveguide material may be rolled into a rolled hollow preform. The rolled hollow preform may be subjected to the extrusion process to form the optical waveguide having a cladding and a hollow core region surrounded by the cladding. The term "rolled hollow preform" may mean a rolled preform having a shape/configuration like a ring (or ring portion) with a hollow portion therewithin. The ring portion corresponds to the at least one sheet of waveguide material that has been rolled. In this way, the ring portion and the hollow portion of the rolled hollow preform may correspond respectively to the cladding and the hollow core region of the optical waveguide that is extruded.

In various embodiments, in order to form the plurality of light interacting structures within the optical waveguide, the plurality of light interacting structures may be patterned onto a surface portion of the at least one sheet of waveguide material (prior to rolling the at least one sheet of waveguide material) for forming the plurality of light interacting structures on an inner surface (or inner wall) of the cladding of the optical waveguide that is extruded. The at least one sheet of waveguide material may then be rolled into the rolled hollow preform such that the surface portion of the at least one sheet of waveguide material with the patterned plurality of light interacting structures may be on an inner surface portion of the rolled hollow preform. In various embodiments, patterning of the plurality of light interacting structures may be performed using a stamping process or an ink-jet printing process.

In various embodiments, the plurality of light interacting structures may be formed during the extrusion process, wherein an extrusion die used in the extrusion process has an exit opening with a predetermined structural pattern for forming the plurality of light interacting structures having a complementary pattern to the structural pattern on an inner surface (or inner wall) of the cladding of the optical waveguide that is extruded.

In various embodiments, the plurality of light interacting structures may include a plurality of protruding structures (or peaks) extending from the inner surface of the cladding of the optical waveguide.

In various embodiments, a period between adjacent protruding structures of the plurality of protruding structures decreases, along the length portion of the optical waveguide, in the (longitudinal) direction away from the at least one input region of the optical waveguide.

In various embodiments, the plurality of protruding structures may include scatterers to scatter the source light or reflectors to reflect the source light through a peripheral surface of the optical waveguide over the length portion of the optical waveguide to form the illumination light.

In various embodiments, each protruding structure of the plurality of protruding structures may have a cross-sectional shape of a triangle, a square or a rectangle.

In various embodiments, the method may further include providing scatterers or fluorophores within the at least one sheet of waveguide material when forming the at least one sheet of waveguide material. The scatterers or fluorophores may be provided prior to rolling the at least one sheet of waveguide material into the rolled hollow preform. In this way, the scatterers or fluorophores may be provided in the cladding of the optical waveguide that is extruded.

In various embodiments, the method may further include forming a (light) diffusion layer on the optical waveguide.

In various embodiments, at 164, the method may further include connecting a coupling assembly to the optical waveguide, the at least one light source being received in the coupling assembly. The coupling assembly may include a housing to receive the at least one light source, the housing having at least one reflective inner surface to reflect the source light towards the optical waveguide. The coupling assembly may further include at least one light absorption region arranged proximal to the at least one input region of the optical waveguide. The coupling assembly may further include an optical lens (or collecting lens) to focus or collimate the source light into the optical waveguide.

In various embodiments, the method may further include forming a locking mechanism to secure the coupling assembly to the optical waveguide.

In various embodiments, the at least one light source may include at least one light emitting diode (LED) or at least one laser diode (LD).

In the context of various embodiments, the at least one light source may have a lumen rating of between about 200 lm and about 2000 lm, for example, between about 200 lm and about 1000 lm, between about 200 lm and about 500 lm, between about 500 lm and about 2000 lm, between about 1000 lm and about 2000 lm, or between about 500 lm and about 1500 lm.

In various embodiments, at 162, a flexible optical waveguide may be formed.

In the context of various embodiments, the optical waveguide may have a cross sectional dimension of between about 1 mm and about 20 mm, for example, between about 1 mm and about 10 mm, between about 1 mm and about 5 mm, between about 5 mm and about 10 mm, between about 5 mm and about 20 mm, or between about 10 mm and about 20 mm.

In the context of various embodiments, the length portion of the optical waveguide may be at least 0.5 m. (i.e., ≥0.5 m), e.g., at least 1 m, at least 2 m or at least 5 m.

In the context of various embodiments, the optical waveguide may include a cylindrical waveguide, a rod waveguide or a planar waveguide (e.g., in the form/shape of a ribbon or a sheet).

In the context of various embodiments, the optical waveguide may have a cross-sectional shape of a circle, an ellipse, a rectangle, a square, or a triangle. However, it should be appreciated that the optical waveguide may have any suitable cross-sectional polygonal shape.

While the method described above is illustrated and described as a series of steps or events, it will be appreciated that any ordering of such steps or events are not to be interpreted in a limiting sense. For example, some steps may occur in different orders and/or concurrently with other steps or events apart from those illustrated and/or described herein. In addition, not all illustrated steps may be required to implement one or more aspects or embodiments described herein. Also, one or more of the steps depicted herein may be carried out in one or more separate acts and/or phases.

FIG. 1E shows a flow chart 170 illustrating a method of forming a lighting apparatus, according to various embodiments.

At 172, an optical waveguide is formed, the optical waveguide having a cladding and a hollow core region surrounded by the cladding.

At 174, at least one light source is connected to the optical waveguide at an at least one input region of the optical waveguide, the at least one light source configured to provide a source light to enter the optical waveguide through the at least one input region for propagation within the hollow core region.

At 176, a plurality of light interacting structures are formed on at least one inner surface (or inner wall) of the cladding, the plurality of light interacting structures adapted to interact with the source light to provide an illumination light emitted from the optical waveguide to an ambient environment.

The method of forming a lighting apparatus as described in the context of the flow chart 160 may be similarly applicable to the method of forming a lighting apparatus as described in the context of the flow chart 170.

FIG. 1F shows a flow chart 180 illustrating a method of forming a lighting apparatus, according to various embodiments.

At 182, an optical waveguide is formed, for optical coupling to at least one light source, the optical waveguide having at least one input region for a source light to enter the optical waveguide for propagation within the optical waveguide.

At 184, a plurality of light interacting structures are formed within the optical waveguide, the plurality of light interacting structures adapted to interact with the source light to provide an illumination light emitted from the optical waveguide to an ambient environment, wherein a concentration of the plurality of light interacting structures increases, along a length portion of the optical waveguide, in a direction away from the at least one input region. In various embodiments, the concentration (or distribution or density) may increase, along the length portion in the (longitudinal) direction away from the at least one input region, such that the illumination light provides at least substantially uniform illumination over the length portion.

The method of forming a lighting apparatus as described in the context of the flow chart 160 may be similarly applicable to the method of forming a lighting apparatus as described in the context of the flow chart 180.

Non-limiting examples of the lighting apparatus of various embodiments will now be described with reference to FIGS. 2A, 2B, 3A and 3B, which are composed of edge LEDs and a flexible high luminance waveguide as illustrated. FIGS. 2A, 2B, 3A and 3B illustrate the high luminance waveguide in various embodiments. The optical waveguide may have a hollow core region (see FIGS. 2A and 2B) or a solid core region (see FIGS. 3A and 3B).

Figure 2A:
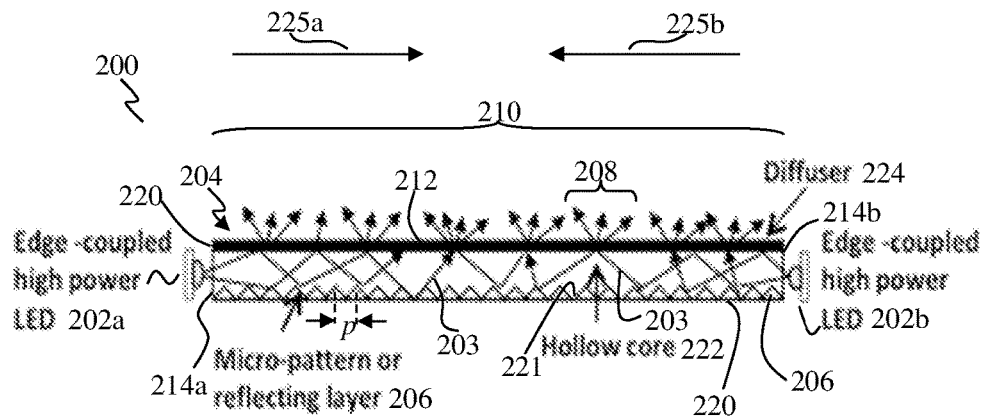
FIGS. 2A and 2B show schematic side view and cross sectional view respectively of a lighting apparatus, according to various embodiments.
Figure 2B:
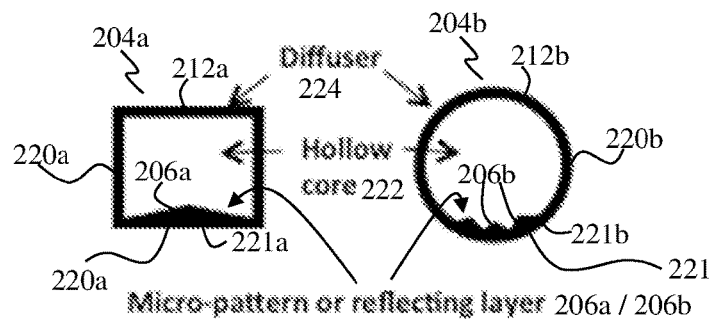

FIGS. 2A and 2B show schematic side view and cross sectional view (or front view) respectively of a lighting apparatus 200, according to various embodiments, illustrating a lighting apparatus 200 with a hollow core illuminating waveguide 204.

Referring to FIG. 2A, the lighting apparatus 200 includes an optical waveguide 204 having a hollow core region 222 surrounded by a cladding 220. Two light sources, for example, in the form of LEDs 202a, 202b, are optically coupled to the optical waveguide 204. The LEDs 202a, 202b may be arranged adjacent to or connected to opposite end regions of the optical waveguide 204. In this way, the LEDs 202a, 202b may be edge LEDs or edge-coupled LEDs 202a, 202b.

The LEDs 202a, 202b may provide a source light 203 to be received by the optical waveguide 204 to propagate within the hollow core region 222. The source light 203 may enter the optical waveguide 204 at respective opposite end facets 214a, 214b of the optical waveguide 204. Therefore, the opposite end facets 214a, 214b may be defined as the input regions of the optical waveguide 204. In a hollow core waveguide, such as the optical waveguide 204 having the hollow core region 222, the launched light (or source light 203) from the edge LEDs 202a, 202b may not be wasted by the waveguide material absorption.

A plurality of light interacting structures 206 may be arranged within the optical waveguide 204, such as at an inner surface (or inner wall) 221 of the cladding 220. The plurality of light interacting structures 206 may be arranged along a length portion 210 of the optical waveguide 204. The plurality of light interacting structures 206 may be in the form of a micro-patterned layer and/or having one or more mirrors (or reflecting surfaces).

The plurality of light interacting structures 206 may be a plurality of protruding structures (or peaks) 206 extending from the inner surface 221 of the cladding 220 into the hollow core region 222. The plurality of protruding structures 206 may have a cross-sectional triangular shape.

The plurality of light interacting structures 206 may interact with the source light 203 propagating within the hollow core region 222 so as to provide an illumination light 208 emitted from the optical waveguide 204, over the length portion 210, to an ambient environment so as to provide lighting to the surrounding. For example, the plurality of protruding structures 206 may scatter or reflect the source light 203, which may then be transmitted through the peripheral surface 212 of the optical waveguide 204 to form the illumination light 208. All, substantially all, or a significant part of the launched light (or source light 203) may be substantially or completely scattered by the micro-patterned layer and/or mirror (i.e., the plurality of light interacting structures 206). The peripheral surface 212 is a surface on a side opposite to the inner surface 221 of the cladding 220 where the plurality of light interacting structures 206 are formed. A diffusion layer 224 may be provided at or on the peripheral surface 212 to promote even illumination.

While not clearly shown in FIG. 2A, the plurality of light interacting structures 206 may be arranged such that the concentration (or distribution) of the plurality of light interacting structures 206 increases, along the length portion 210, in a first direction (represented by the arrow 225a) away from the end facet 214a and in a second direction (represented by the arrow 225b) away from the end facet 214b. The concentration of the plurality of light interacting structures 206 may increase in the first direction 225a and in the second direction 225b towards or to the central portion or region of the optical waveguide 204. The concentration (or distribution) of the plurality of light interacting structures 206 may increase in a manner as described above such that the illumination light 208 may provide at least substantially uniform illumination over the length portion 210.

The concentration of the plurality of light interacting structures 206 along the length portion 210 may be changed by varying the period, p, between adjacent light interacting structures (or adjacent protruding structures) 206. For example, for a higher concentration, adjacent light interacting structures 206 may be arranged closer to each other where, consequently, the period, p, is smaller, while for a lower concentration, adjacent light interacting structures 206 may be arranged further apart from each other where, consequently, the period, p, is larger. The distribution of the plurality of light interacting structures 206 along the length portion 210 will be described further below with reference to FIG. 5A.

The optical waveguide 204 may have a suitable cross-sectional polygonal shape, For example, as shown in FIG. 2B, the optical waveguide 204 of FIG. 2A may be the optical waveguide 204a having a cross-sectional rectangular shape or the optical waveguide 204b having a cross-sectional circular shape.

The optical waveguide 204a has a hollow core region 222 surrounded by a cladding 220a. A plurality of light interacting structures 206a are formed on an inner surface 221a of the cladding 220a. As shown in FIG. 2B, one light interacting structure 206a may be formed across a width of the optical waveguide 204a. The plurality of light interacting structures 206a may have a cross-sectional triangular shape. The optical waveguide 204a may include a diffusion layer 224 on a peripheral surface 212a of the optical waveguide 204a, that is on a side of the optical waveguide 204a opposite to that of the inner surface 221a.

The optical waveguide 204b has a hollow core region 222 surrounded by a cladding 220b. A plurality of light interacting structures 206b are formed on an inner surface 221b of the cladding 220b. As shown in FIG. 2B, three light interacting structure 206b may be formed across a width of the optical waveguide 204b. The plurality of light interacting structures 206b may have a cross-sectional triangular shape.

The optical waveguide 204b may include a diffusion layer 224 on a peripheral surface 212b of the optical waveguide 204b, that is on a side of the optical waveguide 204b opposite to that of the inner surface 221b.

It should be appreciated that any number of the light interacting structures 206a, 206b may be provided across the width of the optical waveguide 204a, 204b, for example, one, two, three or any higher number.

Figure 3A:
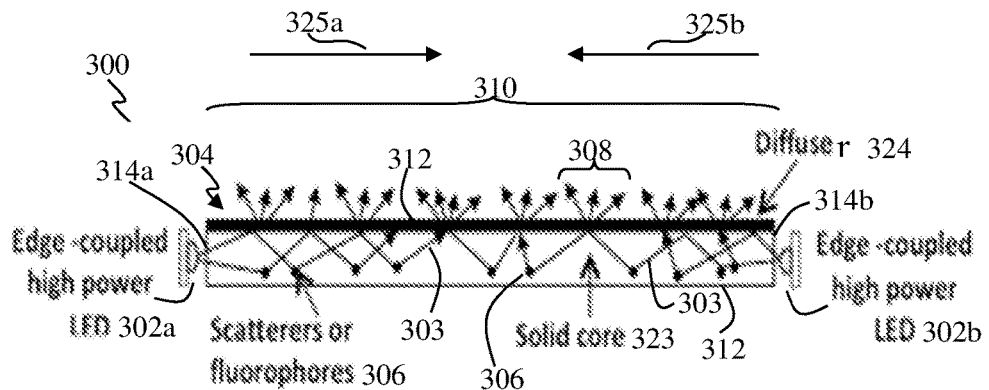
FIGS. 3A and 3B show schematic side view and cross sectional view respectively of a lighting apparatus, according to various embodiments.
Figure 3B:
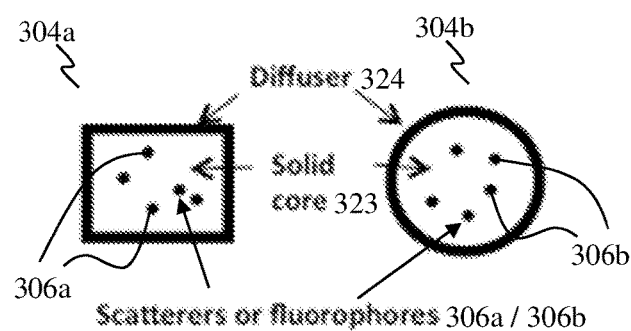

FIGS. 3A and 3B show schematic side view and cross sectional view (or front view) respectively of a lighting apparatus 300, according to various embodiments, illustrating a lighting apparatus 300 with a solid core illuminating waveguide 304.

Referring to FIG. 3A, the lighting apparatus 300 includes an optical waveguide 304 having a solid core region 323. Two light sources, for example, in the form of LEDs 302a, 302b, are optically coupled to the optical waveguide 304. The LEDs 302a, 302b may be arranged adjacent to or connected to opposite end regions of the optical waveguide 304. In this way, the LEDs 302a, 302b may be edge LEDs or edge-coupled LEDs 302a, 302b.

The LEDs 302a, 302b may provide a source light 303 to be received by the optical waveguide 304 to propagate within the solid core region 323. The source light 303 may enter the optical waveguide 304 at respective opposite end facets 314a, 314b of the optical waveguide 304. Therefore, the opposite end facets 314a, 314b may be defined as the input regions of the optical waveguide 304.

A plurality of light interacting structures 306 may be arranged or disposed within the solid core region 323. The plurality of light interacting structures 306 may be arranged along a length portion 310 of the optical waveguide 304.

The plurality of light interacting structures 306 may interact with the source light 303 propagating within the solid core region 323 so as to provide an illumination light 308 emitted from the optical waveguide 304, over the length portion 310, to an ambient environment so as to provide lighting to the surrounding.

The plurality of light interacting structures 306 may include at least one of scatterers to scatter the source light 303 through a peripheral surface 312 of the optical waveguide 304 over the length portion 310 of the optical waveguide 304 to form the illumination light 308, or fluorophores to absorb the source light 308, and, in response to the absorption, to generate (or emit) a resultant light (e.g., fluorescence) that is transmitted through a peripheral surface 312 of the optical waveguide 304 over the length portion 310 of the optical waveguide 304 to form the illumination light 308. In this way, in the optical waveguide 304 having the solid core region 323 (e.g., a solid core waveguide), the coupled light (or source light 303) from the LEDs 302a, 302b may be scattered by the distributed scatterers or fluorophores, which may lead to homogeneous side illumination. The scatterers may be in a form of, for example, nanoparticles, quantum dots, or bubbles. The fluorophores may change the illuminating colour(s), for example, of the illumination light 308, from that of the source light 303. A diffusion layer 324 may be provided at or on the peripheral surface 312 to promote even illumination.

While not clearly shown in FIG. 3A, the optical waveguide 304 may provide 360° illumination. In other words, the illumination light 308 may be emitted in all directions from the perimeter of the optical waveguide 304.

While not clearly shown in FIG. 3A, the plurality of light interacting structures 306 may be arranged such that the concentration (or distribution) of the plurality of light interacting structures 306 increases, along the length portion 310, in a first direction (represented by the arrow 325a) away from the end facet 314a and in a second direction (represented by the arrow 325b) away from the end facet 314b. The concentration of the plurality of light interacting structures 306 may increase in the first direction 325a and in the second direction 325b towards or to the central portion or region of the optical waveguide 304. The concentration (or distribution) of the plurality of light interacting structures 306 may increase in a manner as described above such that the illumination light 308 may provide at least substantially uniform illumination over the length portion 310.

The concentration the plurality of light interacting structures 306 along the length portion 310 may be changed by varying the number of the plurality of light interacting structures 306 along the length portion 310. For example, for a higher concentration, a higher number of the plurality of light interacting structures 306 may be provided, while for a lower concentration, a lower number of the plurality of light interacting structures 306 may be provided. The distribution of the plurality of light interacting structures 306 will be described further below with reference to FIG. 5A.

The optical waveguide 304 may have a suitable cross-sectional polygonal shape, For example, as shown in FIG. 3B, the optical waveguide 304 of FIG. 3A may be the optical waveguide 304a having a cross-sectional rectangular shape or the optical waveguide 304b having a cross-sectional circular shape.

Each of the optical waveguides 304a, 304b has a solid core region 323. A plurality of light interacting structures (e.g., scatterers or fluorophores) 306a, 306b are disposed within the solid core region 323. Each of the optical waveguides 304a, 304b may include a diffusion layer 324 that may at least substantially surround or completely surround the solid core region 323.

The optical waveguide 304, 304a, 304b with a solid core region 323 (or solid waveguide) may provide 360° illumination, while in the optical waveguide 304, 304a, 304b with a hollow core region 222 (or hollow waveguide), the illuminating side may be controllable by adjusting/adding direction or placement of one or more scattering (or reflecting) layers, in the form of the plurality of light interacting structures 206, 206a, 206b, along one or more inner walls (e.g., 221) of the cladding 220.

The circular waveguide 204b, 304b may be bendable in an arbitrary direction whereas for the rectangular waveguide 204a, 304a, the bending direction may be controlled, e.g. the short axis of the rectangle is within a bending plane.

Figure 4A:
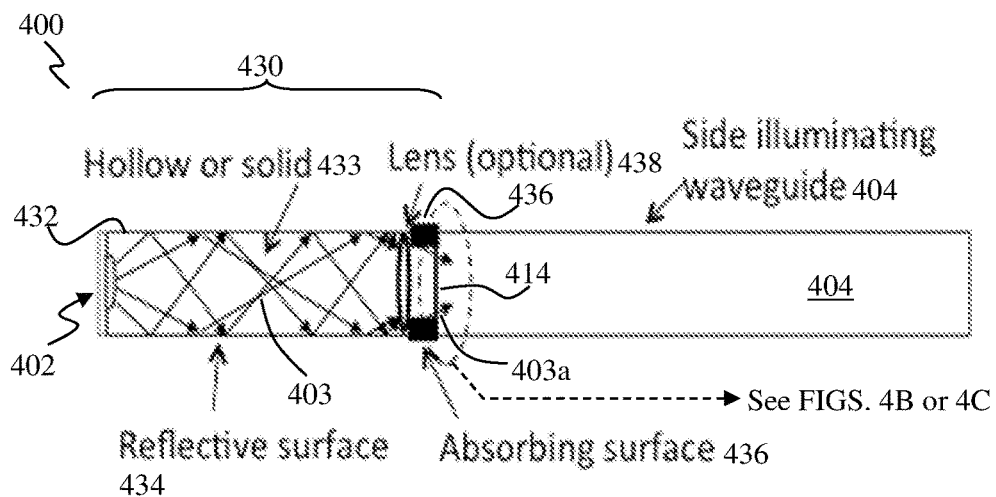
FIG. 4A shows a schematic side view of a lighting apparatus with a coupling assembly, according to various embodiments.

In various embodiments, a coupling assembly may be provided to house one or more light sources. FIG. 4A shows a schematic side view of a lighting apparatus 400 with a coupling assembly (or coupling rig) 430, according to various embodiments. The coupling assembly 430 may be used with one or more LEDs, and may be defined as a LED coupling assembly (or LED coupling rig) 430. For clarity and ease of understanding, the coupling assembly 430 is shown as being provided adjacent to one end facet 414 of the optical waveguide 404. However, the coupling assembly 430 may similarly be provided adjacent to the opposite end facet of the optical waveguide 404 in embodiments where one or more light source(s) may also be provided at the opposite end facet.

The coupling assembly 430 may be connected to the optical waveguide 404, for example, at the end facet 414 of the optical waveguide 404. The coupling assembly 430 includes a housing 432, which may be solid or hollow (e.g., an internal hollow or solid structure 433), where a light source (e.g., LED) 402 may be positioned in the housing 432. The housing 432 may include at least one reflective inner surface 434 to reflect the source light 403 generated by the light source 402 towards the optical waveguide 404. The coupling assembly 430 may further include at least one light absorption region or surface 436 arranged proximal to the optical waveguide 404 or proximal to the end facet 414. The light absorption region or surface 436 may be provided at or close to the connecting point or interface between the coupling assembly 430 and the optical waveguide 404. The coupling assembly 430 may optionally further include an optical lens (or collecting lens) 438 to provide a focused or collimated source light 403a into the optical waveguide 404.

The coupling assembly 430 may first capture the wide spreading emission (or source light 303) of the light source (e.g., LED) 402 by at least partially surrounding the LED 402 with one or more reflective surfaces 434. The captured light (which is the source light 303) may be directed to the optical lens 438, and may be focused into or collimated the optical waveguide 404. The surrounding surfaces after the lens 438 may be changed to or provided with absorbing materials 436 to stop any emission with a wider angle than the capturing angle of the lens 438. In this way, the source light 303 (e.g., LED emission) may be coupled to the waveguide 404 without a strong scattering effect, and any emission above the capturing angle of the lens 438 may be absorbed by the surrounding absorbing surfaces 436 in the coupling assembly 430. Current technologies or prior art do not consider the scattering at the coupling ends.

The size of the coupling assembly 430 may be equivalent to (same) or smaller than the size of the optical waveguide 404 to reduce coupling scattering. More than one light source 402 (e.g., LED chip) may be accommodated in the coupling assembly 430 to increase the coupled LED power.

There may be variation in the coupling assembly 430 depending on the side illuminating waveguide design. When an optical waveguide with a solid core region (e.g., a solid waveguide), e.g., 304 (FIG. 3A), is used as the optical waveguide 404, the coupling assembly 430 may contain the lens 438 to prevent coupling scattering at the joint or connection between the coupling assembly 430 and the optical waveguide 404. The housing 432 may have a hollow structure 433 with one or more reflective surface(s) 434, or may be made of a solid material with the same refractive index as that of the optical waveguide 404 to minimise scattering at the joint or connection. When an optical waveguide with a hollow core region (i.e., a hollow waveguide), e.g., 204 (FIG. 2A), is used as the optical waveguide 404, the housing 432 may be hollow or solid, and the lens 438 may be optional.

In various embodiments, a locking mechanism may be provided at the joint or connection between the coupling assembly 430 and the optical waveguide 404 to firmly hold the joint or connection. In this way, the locking mechanism may help to secure the coupling assembly 430 to the optical waveguide 404.

Figure 4B:
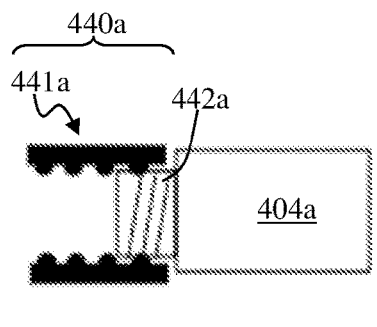
FIGS. 4B and 4C show schematics of a locking mechanism, according to various embodiments.
Figure 4C:
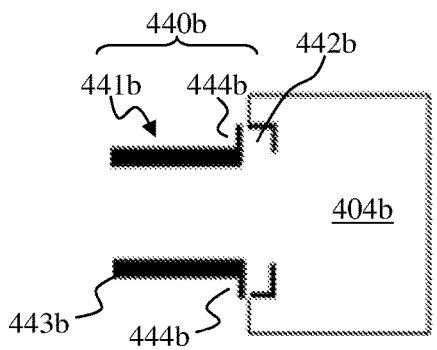

FIGS. 4B and 4C show schematics of a locking mechanism 440a, 440b, according to various embodiments. The locking mechanism 440a may be of a thread-type mechanism, including complementary threaded structures 441a, 442a that cooperate to provide the locking function. A first threaded structure 441a may be provided at or with the coupling assembly (not shown) while a second threaded structure 442a may be provided at or with the optical waveguide 404a. The second threaded structure 442a may, for example, be a member separate from the optical waveguide 404a and may be adhered to or affixed to the optical waveguide 404a, e.g., using an adhesive.

The locking mechanism 440b may be of a click-type mechanism, including complementary structures 441b, 442b that cooperate to provide the locking function. A first structure 441b, for example, a (hollow) protrusion or (hollow) bar 443b with a flange 444b, may be provided at or with the coupling assembly (not shown) while a recess 442b may be provided at or with the optical waveguide 404b. The flange 444b may be clicked fitted into the recess 442b.

Figures 5A, 5B:
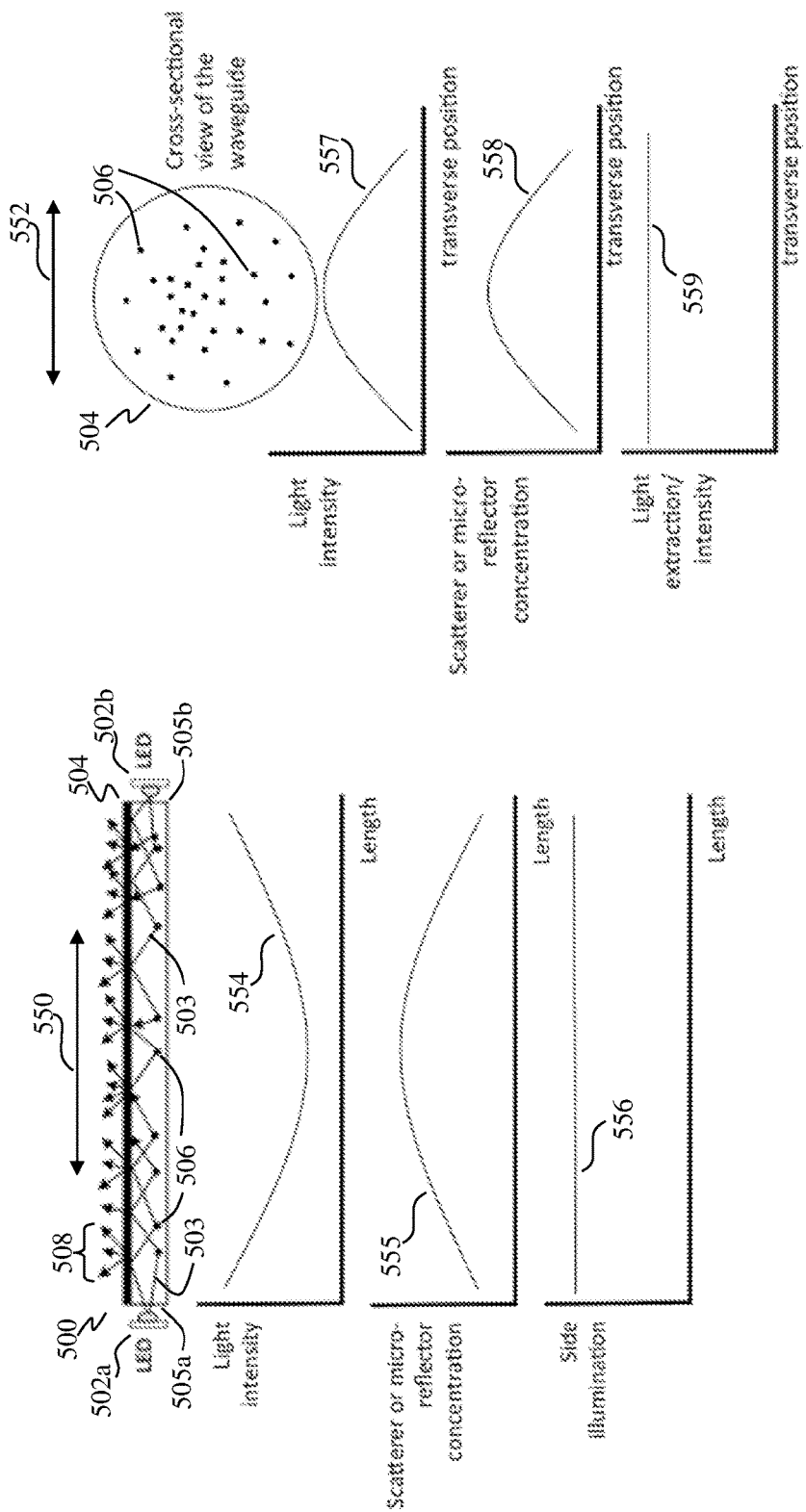
FIGS. 5A and 5B illustrate the concentration profiles of the plurality of light interacting structures within an optical waveguide, according to various embodiments.

In various embodiments, in order to maintain the brightness uniformity along the optical waveguide, the distribution or concentration of the plurality of light interacting structures (e.g., scatterers) may be controlled in the longitudinal direction and/or the transverse direction. FIGS. 5A and 5B illustrate the concentration profiles of the plurality of light interacting structures within an optical waveguide, according to various embodiments. The concentration profiles as shown in FIGS. 5A and 5B may illustrate the optimised distribution of the plurality of light interacting structures (e.g., scatterers or reflecting micro-patterns). The concentration profiles as shown in FIGS. 5A and 5B may be applicable for the plurality of light interacting structures in an optical waveguide with a solid core region or a hollow core region.

Using the lighting apparatus 500 with an optical waveguide 504 with a plurality of light interacting structures (e.g., scatterers or micro-pattern/micro-reflector) 506 illustrated in FIG. 5A as a non-limiting example, the source light 503 generated by the LEDs 502a, 502b and propagating in the optical waveguide 504 may have an intensity that decreases, along the longitudinal direction (represented by the double-headed arrow 550), from the end regions 505a, 505b of the optical waveguide 504 to a minimum at the central portion of the optical waveguide 504, as illustrated by the intensity profile 554.

As shown by the concentration profile 555, the concentration (or density) of the plurality of light interacting structures 506 may be gradually increased, along the longitudinal direction 550, from the end regions 505a, 505b to a maximum at the central region of the optical waveguide 504. The concentration profile 555 may follow a Gaussian profile (or parabolic profile). The maximum point for the concentration profile 555 and the minimum point for the intensity profile 554 may overlap each other at about the same portion or region of the optical waveguide 504.

By having the concentration of the plurality of light interacting structures 506 gradually increasing towards the middle of the optical waveguide 504, for example, more scattering may take place where the intensity of the source light (LED light) 503 may be lower. By tailoring the concentration profile 555 based on the intensity profile 554, the illumination light 508 may provide at least substantially uniform illumination (as illustrated in the illumination profile 556) over the length (portion) of the optical waveguide 504. In this way, the plurality of light interacting structures 506 arranged according to the concentration profile 555 may act as compensation or counterbalance to the change in the intensity of the source light 503 along the longitudinal direction (or length) 550 of the optical waveguide 504.

In various embodiments, the concentration or distribution of the plurality of light interacting structures 506 along the transverse direction (represented by the double-headed arrow 552) may be adjusted to counterbalance the LED beam profile. For example, where the LED beam profile follows a Gaussian shape, as illustrated by the intensity profile 557, where the intensity increases towards the inner region of the optical waveguide 504, the plurality of light interacting structures 506 may be more concentrated in the centre for better extraction efficiency. For example, the concentration of the plurality of light interacting structures 506 may gradually increase, along the transverse direction 552, from an outer region of the optical waveguide 504 to an inner region of the optical waveguide 504, as illustrated by the concentration profile 558. The concentration profile 558 may follow a Gaussian profile or a parabolic profile. The intensity profile 557 and the concentration profile 558 may follow the same profile shape.

By tailoring the concentration profile 558 based on the intensity profile 557, light extraction (of the source light 503) may be at least substantially uniform along the transverse direction 552, as illustrated in the profile 559.

Figure 6:
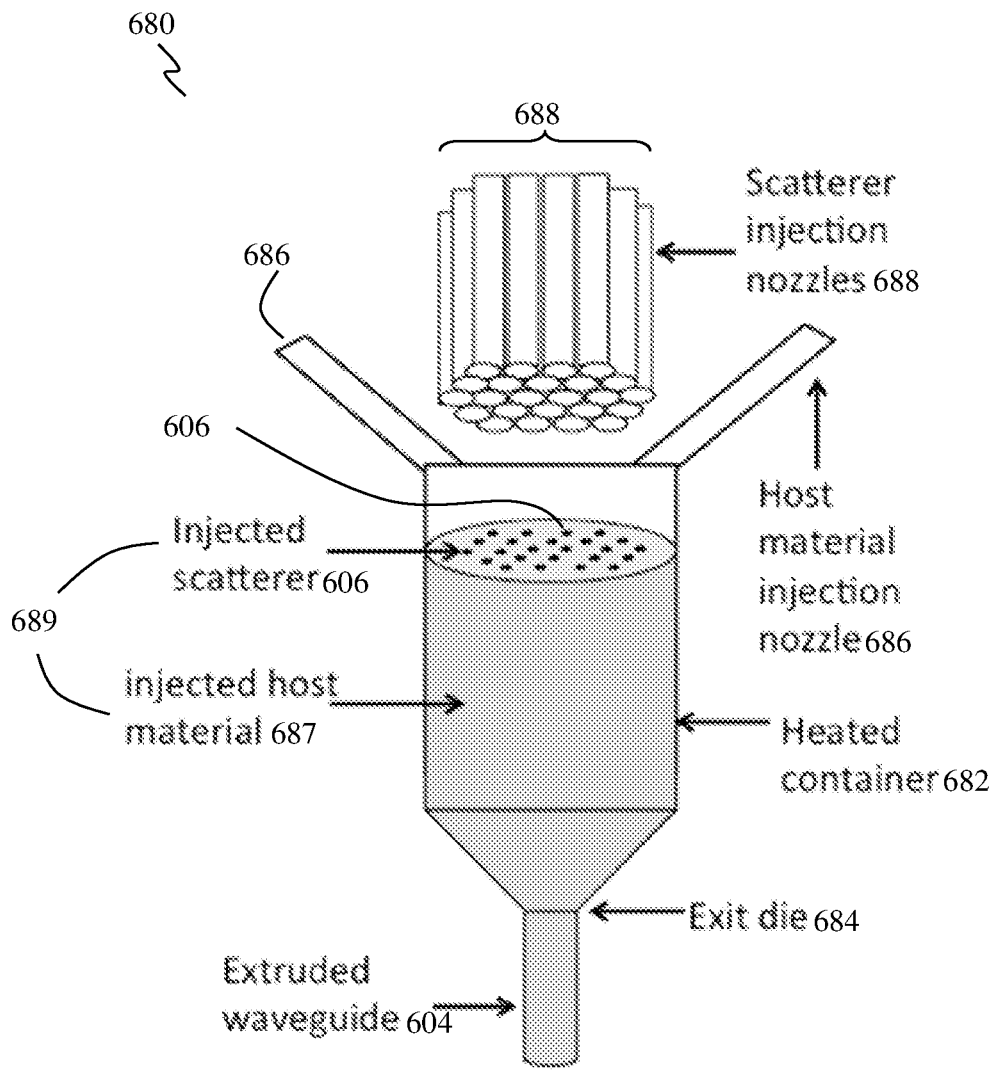
FIG. 6 shows a schematic diagram of an extrusion process for forming an optical waveguide, according to various embodiments.
Figure 7:
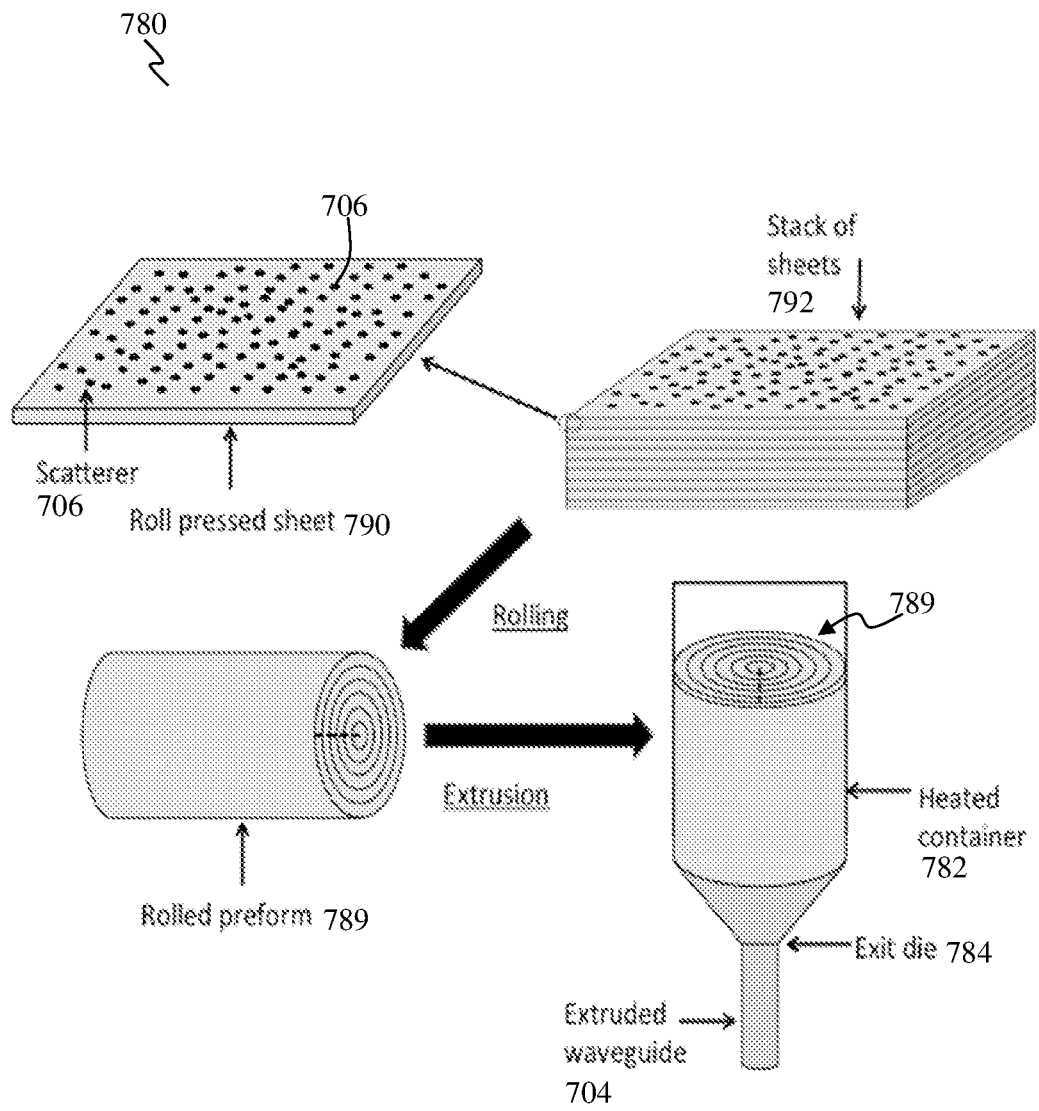
FIG. 7 shows, as perspective views, various processing stages of a rolling and extrusion process for forming an optical waveguide, according to various embodiments.

Various embodiments may also provide methods of manufacturing the optical waveguide for forming the lighting apparatus. Two manufacturing approaches are described as non-limiting examples with reference to FIGS. 6 and 7. While FIGS. 6 and 7 illustrate processes for extruding an optical waveguide having a solid core region, the processes may be modified for forming an optical waveguide having a hollow core region, as will be described further below. Further, while the manufacturing processes are described using scatterers as the plurality of light interacting structures, it should be appreciated that other types (e.g., fluorophores) of the plurality of light interacting structures may be employed.

The first approach may use direct injection of a molten host material of the optical waveguide to an extrusion rig, as illustrated in FIG. 6. FIG. 6 shows a schematic diagram 680 of an extrusion process for forming an optical waveguide, according to various embodiments. The extrusion process may, for example, be carried out using an extrusion rig. An extrusion chamber or container 682 and an extrusion die (or exit die) 684 that is connected to the exit point of the extrusion chamber 682 may be used for the extrusion process.

The (molten) host material for the waveguide preform for forming the optical waveguide may first be injected, for example, via one or more injection nozzles 686, into the container 682, which may be heated. Scatterers 606 may be fed into the host material 687 in the container 682, for example, via a plurality of injection nozzles 688. The injection nozzles 688 for the scatterers 606 may be separate (or independent) from the injector or injection nozzle(s) 686 for the host material. This may allow independent control of the respection injection or feeding of the molten material 687 and the scatterers 606. The scatterer injection nozzles 688 may be bundled together so as to have a control of the spatial distribution of the scatterers 688. The injected (molten) material 687 and the scatterers 606 may form a (bulk) waveguide preform 689 in the heated container 682 before being extruded through the extrusion die 684 as an optical waveguide 604 having the scatterers 606. The extrusion die 684 may have a predetermined exit opening size and/or cross sectional shape/configuration that may be transferred to the extruded optical waveguide 604 as the waveguide preform 689 passes through the extrusion die 684 to be extruded as the optical waveguide 604. The extruded optical waveguide 604 may be an optical waveguide having a solid core region (i.e., a solid core waveguide).

The temperature of the container 682 may be slightly above the softening point of the host material 687. This temperature control may ensure sufficient viscosity of the material 687 to prevent the scatterers 606 from flowing freely in the preform 689.

In various embodiments, the amount and/or speed of injection of the scatterers 606 into the molten material 687 in the container 682 may be controlled so as to vary the concentration of the scatterrers along a length or height (longitudinal direction) of the molten material 687 in the container 682 so that the concentration of the scatterers in the extruded optical waveguide 604 along the length of the optical waveguide 604 may be varied in a manner as described above (e.g., so that uniform illumination may be achieved from the optical waveguide when used in the lighting apparatus of various embodiments). Further, the concentration of the scatterrers 606 along a width (transverse direction) of the molten material 687 in the container 682 may be varied so that the concentration of the scatterers 606 in the extruded optical waveguide 604 across the width of the optical waveguide 604 may be varied in a manner as described above.

In further embodiments, a solid (bulk) waveguide preform, with no hollow portion therewithin, may be pre-fabricated. Scatterers may be disposed within the waveguide preform during the pre-fabrication process. The pre-fabricated waveguide preform may then be provided to the heated container 682 to be extruded as described above to form an optical waveguide (e.g., 604) with a solid core region (i.e., a solid core waveguide).

The concentration of the scatterrers along a length or height (longitudinal direction) of the (pre-fabricated) waveguide preform may be varied so that the concentration of the scatterers in the extruded optical waveguide along the length of the optical waveguide may be varied in a manner as described above (e.g., so that uniform illumination may be achieved from the optical waveguide when used in the lighting apparatus of various embodiments). Further, the concentration of the scatterrers along a width (transverse direction) of the (pre-fabricated) waveguide preform may be varied so that the concentration of the scatterers in the extruded optical waveguide across the width of the optical waveguide may be varied in a manner as described above.

In various embodiments, for extruding an optical waveguide with a cladding and a hollow core region surrounded by the cladding (i.e., a hollow core waveguide), a molten material of the waveguide preform may be provided into the container 682, which may be heated, to form a ring preform having a ring portion and a hollow portion therewithin. The container 682 may be modified to have a solid inner central portion where the molten material may not be provided so as to define the hollow portion of the ring preform. As the ring preform is extruded through the extrusion die, a plurality of light interacting structures may be formed on an inner surface (or inner wall) of the cladding of the optical waveguide that is extruded. The extrusion die may have an exit opening with a predetermined structural pattern for forming the plurality of light interacting structures having a complementary pattern to the structural pattern. The concentration of the plurality of light interacting structures may be varied, in the longitudinal and/or transverse direction of the optical waveguide, by controlling the predetermined structural pattern of the exit opening of the extrusion die.

In further embodiments, a waveguide ring preform, having a ring portion and a hollow portion therewithin, may be pre-fabricated. A plurality of light interacting structures may be formed on an inner surface (or inner wall) of the ring portion of the waveguide preform during the pre-fabrication process. The pre-fabricated waveguide preform may then be provided to the heated container 682 to be extruded as described above to form an optical waveguide having a cladding with a hollow core region (i.e., a hollow core waveguide). The concentration of the plurality of light interacting structures along a length or height (longitudinal direction) of the (pre-fabricated) waveguide ring preform may be varied so that the concentration of the light interacting structures in the extruded optical waveguide along the length of the optical waveguide may be varied in a manner as described above (e.g., so that uniform illumination may be achieved from the optical waveguide when used in the lighting apparatus of various embodiments). Further, the concentration of the light interacting structures along a width (transverse direction) of the (pre-fabricated) waveguide ring preform may be varied so that the concentration of the light interacting structures in the extruded optical waveguide across the width of the optical waveguide may be varied in a manner as described above.

A second approach for forming the optical waveguide may be employed, involving two steps: preform fabrication and waveguide extrusion as illustrated in FIG. 7. FIG. 7 shows, as perspective views, various processing stages of a rolling and extrusion process 780 for forming an optical waveguide, according to various embodiments.

For forming a waveguide preform, a plurality of sheets (or layers) 790 of waveguide material or host material may first be formed, with embedded scatterers 706. The scatterers 706 may be dispersed on the sheet(s) 790 by a motorised distributor containing the scatterers 706. The distributor may traverse the sheet(s) 790 at a controlled speed to vary the concentration or density of the scatterers 706 across the sheet(s) 790, for example, in a manner as described above (e.g., so that uniform illumination may be achieved from the optical waveguide when used in the lighting apparatus of various embodiments). The distributor may have a plurality of apertures at its bottom as exit openings for delivering the scatterers 706 to the sheet(s) 790. The waveguide material or host material may be pressed by rollers to form a thin layer or sheet 790, e.g., using a hot roller pressing technique.

A plurality of the sheets 790 may then be arranged one over the other to form a stack 792 of the sheets 790. Therefore, the waveguide preform may be composed of multiple layers 790 of the host waveguide material with embedded scatterers 706. Each sheet 790 may contain different density and/or size of the scatterers. Hence, when the sheets 790 are stacked together, a complete spatial distribution of the scatterers 706 may be achieved.

The stack 792 may then be rolled to form a compact rolled preform 789 (e.g., a circular preform) for extrusion. The compact rolled preform may be provided into an extrusion chamber or container 782, which may be heated. The compact rolled preform 789 may then be extruded through an extrusion die 784 as an optical waveguide 704 having the scatterers 706. The extrusion die 784 may have a predetermined exit opening size and/or cross sectional shape/configuration that may be transferred to the extruded optical waveguide 704 as the compact rolled preform 789 passes through the extrusion die 784 to be extruded as the optical waveguide 704. The extruded optical waveguide 704 may be an optical waveguide having a solid core region (i.e., a solid core waveguide).

The concentration of the scatterrers 706 along a length or height (longitudinal direction) of the compact rolled preform 789 may be varied, for example by controlling the distribution of the scatterers 706 in the individual sheets 790, so that the concentration of the scatterers in the extruded optical waveguide 704 along the length of the optical waveguide 704 may be varied in a manner as described above (e.g., so that uniform illumination may be achieved from the optical waveguide when used in the lighting apparatus of various embodiments). Further, the concentration of the scatterrers 706 along a width (transverse direction) of the compact rolled preform 789 may be varied, for example by controlling the distribution of the scatterrers 706 in the individual sheets 790, so that the concentration of the scatterers 706 in the extruded optical waveguide 704 across the width of the optical waveguide 704 may be varied in a manner as described above.

In various embodiments, for extruding an optical waveguide with a cladding and a hollow core region surrounded by the cladding (i.e., a hollow core waveguide), at least one sheet of waveguide material or host material may first be formed. The waveguide material or host material may be pressed by rollers to form the at least one sheet of waveguide material, e.g., using a hot roller pressing technique. The at least one sheet of waveguide material may be rolled into a rolled hollow preform having a ring (or ring portion) with a hollow portion therewithin, for extrusion. The rolled hollow preform may be provided into the extrusion chamber or container 782, which may be heated. As the rolled hollow preform is extruded through the extrusion die, a plurality of light interacting structures may be formed on an inner surface (or inner wall) of the cladding of the optical waveguide that is extruded. The extrusion die may have an exit opening with a predetermined structural pattern for forming the plurality of light interacting structures having a complementary pattern to the structural pattern. The concentration of the plurality of light interacting structures may be varied, in the longitudinal and/or transverse direction of the optical waveguide, by controlling the predetermined structural pattern of the exit opening of the extrusion die.

In further embodiments, after forming the at least one sheet of waveguide material or host material, a plurality of light interacting structures may be patterned onto a surface portion of the at least one sheet of waveguide material, e.g., by a stamping process or an ink-jet printing process. The at least one sheet of waveguide material with the patterned plurality of light interacting structures may then be rolled into an additional rolled hollow preform having a ring (or ring portion) with a hollow portion therewithin, for extrusion. The plurality of light interacting structures may be at an inner surface of the ring portion of the additional rolled hollow preform. The additional rolled hollow preform may be provided into the extrusion chamber or container 782, which may be heated, and subsequently be extruded to form an optical waveguide having a cladding with a hollow core region (i.e., a hollow core waveguide), with the plurality of light interacting structures defined on an inner surface (or inner wall) of the cladding of the optical waveguide that is extruded. The plurality of light interacting structures may be patterned in a way that the concentration of the plurality of light interacting structures along a length or height (longitudinal direction) of the additional rolled hollow preform may be varied so that the concentration of the light interacting structures in the extruded optical waveguide along the length of the optical waveguide may be varied in a manner as described above (e.g., so that uniform illumination may be achieved from the optical waveguide when used in the lighting apparatus of various embodiments). Further, the concentration of the light interacting structures along a width (transverse direction) of the additional rolled hollow preform may be varied so that the concentration of the light interacting structures in the extruded optical waveguide across the width of the optical waveguide may be varied in a manner as described above.

In various embodiments, the optical waveguide that is extruded may have any cross-sectional shape, corresponding to the cross-sectional shape of the exit opening of the extrusion die.

In various embodiments, during the extrusion process, a pressure force may be applied onto the upper surface of the waveguide preform to push the waveguide preform through the extrusion die.

In further embodiments, planar waveguides may be employed as the optical waveguide in the lighting apparatus of various embodiments. For example, one or more of the individual sheets 790 may be used as the optical waveguide. The individual sheets 790 may be cut into the desired shape and/or size to form the (planar) optical waveguide. The concentration of the plurality of light interacting structures (e.g., scatterers) may be varied, in the longitudinal and/or transverse direction of the individual sheet(s) 790, in a manner as described above.

Throughout the description, in the context of various embodiments, it should be appreciated that where LED is described as the light source or optical source, additionally or alternatively, LD may be used as the light source or optical source.

As described above, various embodiments may include one or more of the following features or techniques (but not limited to) to achieve the high luminance edge-lighting waveguides:

(1) A large size flexible light strip (or waveguide) may be used, with, for example, at least 0.5 m length for large-scale lighting applications such as façade lightings.

(2) A large size waveguide allows a high coupling efficiency from high power LEDs/LDs or LED/LD arrays for high luminance side illumination.

(3) The waveguide may be composed of weather-proof material compositions for outdoor applications.

(4) The waveguide may be composed of materials suitable for extrusion fabrication process.

(5) The waveguide may be composed of transparent resins or thermoplastics suitable for sol-gel process or 3D printing process.

(6) The waveguide may be in a circular or rectangular or any polygonal shape formed through an extrusion process.

(7) A circular waveguide allows arbitrary bending direction whereas a rectangular waveguide may control the bending direction.

(8) Edge lighting LEDs/LDs may be embedded in the architecture or apparatus. The light strip (or optical waveguide) may be inserted in a pocket between the LEDs/

LDs. In this way, the LED/LD and the light strip may be individually accessible for replacement and maintenance.

(9) The waveguide may have a hollow core region to avoid waveguide material absorption loss.

(10) The hollow core waveguide may contain a micro-pattern or reflecting layer in the inner surface to scatter or reflect light for side illumination.

(11) The waveguide may have a solid core region with scatterers or fluorophores to promote side illumination.

(12) The scatterers or fluorophores, or each of them, may be in a form of nanoparticle, microparticle, air bubble or quantum dot made of polymers, metals, dielectrics or semiconductors possessing a different refractive index from that of the waveguide material.

(13) The fluorophores may change the colours from the LED light colour, and provide a way of colour mixing.

(14) A hollow core waveguide may control the illuminating side(s) by purposely positioning the reflecting or scattering plane(s), while a solid core waveguide may provide 360° illumination.

(15) The waveguide may possess a diffuser (or diffusing layer) to promote even illumination.

(16) A LED coupling rig (or coupling assembly) may be provided, and may include one or more of a reflective surface, a lens and an absorbing surface to avoid or at least minimise coupling scattering.

(17) Manufacturing techniques may involve extrusion and/or multiple layer stacking to produce the scattering (optical) waveguide.

(18) The extrusion technique may have two separate injection nozzles to feed the host material and the scatterers (or fluorophores) independently.

(19) The stacking technique may use multiple layers of a single material to form the waveguide. Each layer may have different scatterers distribution to promote uniform side illumination along the waveguide when lit.

The main target market (apart from various suitable applications) for the various embodiments is architectural lighting including façade lighting application. According to a McKinsey publication (McKinsey & Company publication, Lighting the way: Perspectives on the global lighting market 2nd edition August 2012), architectural lighting is a huge market with USD 6.1 billion projected total revenue in 2020 and almost 50% market share coming from ASIA. Various embodiments, with the corresponding techniques or features, as described herein may deeply penetrate into the market with low maintenance cost and easy installation/seamless connection, and may replace the LED strip that is currently dominant in the façade lighting applications. There is, therefore, a huge potential market to be shared using the various embodiments. The following table provides a non-limiting example for the lighting apparatus of various embodiments.

TABLE 1

Examples of feature/parameters for the lighting apparatus of various embodiments.

| Feature/parameter | Lighting apparatus |
| --- | --- |
| Applications | Façade |
| Waveguide material | Silicone |
| Types of scatterer | Nanoparticles (e.g. Quantum Dot) or fluorophore |
| Light source | LED or LD |
| Waveguide size (mm) | 10-20 |
| Fabrication | Extrusion |
| Light coupling | Edge coupling |

While there are products of prior art available, they are targeted at different applications and market segment. Some of these products are not suitable for large-scale applications because of high manufacturing cost of silica glass fibre, while others have limitation in achievable luminance. For example, the maximum luminance is only about 30 cd/m$^2$ after a length of 1 m. This is too faint for any lighting application. Other products use methyl methacrylate (MMA) or polymethyl methacrylate (PMMA) that is susceptible to heat and causing discoloration. Thus, this is not a choice for outdoor façade applications. Therefore, the existing technologies do not have the scalability and properties that meet the market needs for a unique façade lighting product in the architectural lighting segment. Varous embodiments as described herein may bridge the gap to meet the the market needs not offered by known products.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A lighting apparatus comprising:
    at least one light source configured to provide a source light;
    an optical waveguide optically coupled to the at least one light source, the optical waveguide having at least one input region through which the source light enters the optical waveguide for propagation within the optical waveguide; and
    a plurality of light interacting structures arranged within the optical waveguide, the plurality of light interacting structures adapted to interact with the source light to provide an illumination light emitted from the optical waveguide to an ambient environment,
    wherein a concentration of the plurality of light interacting structures increases, along a length portion of the optical waveguide, in a longitudinal direction away from the at least one input region, and
    wherein the concentration of the plurality of light interacting structures increases, along a width of the optical waveguide, in a transverse direction from an outer region of the optical waveguide to an inner region of the optical waveguide, the transverse direction being perpendicular to the longitudinal direction.

2. The lighting apparatus as claimed in claim 1, wherein the concentration of the plurality of light interacting structures in the transverse direction follows a Gaussian profile or a parabolic profile or a top-hat profile.

3. The lighting apparatus as claimed in claim 1, wherein the at least one light source and the optical waveguide are physically connected to each other.

4. The lighting apparatus as claimed in claim 1, wherein the at least one light source and the optical waveguide are separably connected to each other.

5. The lighting apparatus as claimed in claim 1, wherein the at least one input region comprises at least one end facet of the optical waveguide.

6. The lighting apparatus as claimed in claim 5, wherein the lighting apparatus comprises two light sources respectively arranged at opposite end facets of the optical waveguide, the two light sources configured to provide the source light, and wherein the concentration of the plurality of light interacting structures increases, along the length portion of the optical waveguide, in a respective direction away from each of the opposite end facets.

7. The lighting apparatus as claimed in claim 1,
wherein the optical waveguide comprises a solid core region, and
wherein the plurality of light interacting structures are arranged within the solid core region.

8. The lighting apparatus as claimed in claim 7, wherein the plurality of light interacting structures comprise at least one of scatterers to scatter the source light through a peripheral surface of the optical waveguide over the length portion of the optical waveguide to form the illumination light, or fluorophores to absorb the source light, and, in response to the absorption, to generate a resultant light that is transmitted through a peripheral surface of the optical waveguide over the length portion of the optical waveguide to form the illumination light.

9. The lighting apparatus as claimed in claim 7, wherein the optical waveguide further comprises at least one pattern of peaks and valleys defined in the solid core region to scatter or reflect the source light through a peripheral surface of the optical waveguide over the length portion of the optical waveguide to form the illumination light.

10. The lighting apparatus as claimed in claim 1, wherein the optical waveguide further comprises a diffusion layer.

11. The lighting apparatus as claimed in claim 1, further comprising a coupling assembly connected to the optical waveguide, the at least one light source being received in the coupling assembly.

12. The lighting apparatus as claimed in claim 11, wherein the coupling assembly comprises a housing to receive the at least one light source, the housing comprising at least one reflective inner surface to reflect the source light towards the optical waveguide.

13. The lighting apparatus as claimed in claim 12, wherein the coupling assembly further comprises at least one light absorption region arranged proximal to the at least one input region of the optical waveguide.

14. A lighting apparatus comprising:
an optical waveguide arranged for optical coupling to at least one light source, the optical waveguide having at least one input region for a source light to enter the optical waveguide for propagation within the optical waveguide; and
a plurality of light interacting structures arranged within the optical waveguide, the plurality of light interacting structures adapted to interact with the source light to provide an illumination light emitted from the optical waveguide to an ambient environment,
wherein a concentration of the plurality of light interacting structures increases, along a length portion of the optical waveguide, in a longitudinal direction away from the at least one input region, and
wherein the concentration of the plurality of light interacting structures increases, along a width of the optical waveguide, in a transverse direction from an outer region of the optical waveguide to an inner region of the optical waveguide, the transverse direction being perpendicular to the longitudinal direction.

15. A method of forming a lighting apparatus, the method comprising:
forming an optical waveguide;
connecting at least one light source to the optical waveguide at an at least one input region of the optical waveguide, the at least one light source configured to provide a source light to enter the optical waveguide through the at least one input region for propagation within the optical waveguide; and
forming a plurality of light interacting structures within the optical waveguide, the plurality of light interacting structures adapted to interact with the source light to provide an illumination light emitted from the optical waveguide to an ambient environment, wherein a concentration of the plurality of light interacting structures increases, along a length portion of the optical waveguide, in a longitudinal direction away from the at least one input region, and wherein the concentration of the plurality of light interacting structures increases, along a width of the optical waveguide, in a transverse direction from an outer region of the optical waveguide to an inner region of the optical waveguide, the transverse direction being perpendicular to the longitudinal direction.

16. The method as claimed in claim 15, wherein the at least one input region comprises at least one end facet of the optical waveguide.

17. The method as claimed in claim 16,
wherein connecting at least one light source to the optical waveguide comprises connecting two light sources respectively at opposite end facets of the optical waveguide, the two light sources configured to provide the source light, and
wherein forming the plurality of light interacting structures within the optical waveguide comprises forming the plurality of light interacting structures such that the concentration of the plurality of light interacting structures increases, along the length portion of the optical waveguide, in a respective direction away from each of the opposite end facets.

18. A method of forming a lighting apparatus, the method comprising:
forming an optical waveguide for optical coupling to at least one light source, the optical waveguide having at least one input region for a source light to enter the optical waveguide for propagation within the optical waveguide; and
forming a plurality of light interacting structures within the optical waveguide, the plurality of light interacting structures adapted to interact with the source light to provide an illumination light emitted from the optical waveguide to an ambient environment, wherein a concentration of the plurality of light interacting structures increases, along a length portion of the optical waveguide, in a longitudinal direction away from the at least one input region, and wherein the concentration of the plurality of light interacting structures increases, along a width of the optical waveguide, in a transverse direction from an outer region of the optical waveguide to an inner region of the optical waveguide, the transverse direction being perpendicular to the longitudinal direction.

* * * * *